(12) United States Patent
Yang

(10) Patent No.: US 9,334,723 B2
(45) Date of Patent: *May 10, 2016

(54) METHODS FOR GEOSTEERING A DRILL BIT IN REAL TIME USING SURFACE ACOUSTIC SIGNALS

(71) Applicant: Saudi Arabian Oil Company, Dhahran (SA)

(72) Inventor: Yunlai Yang, Ras Tanura (SA)

(73) Assignee: SAUDI ARABIAN OIL COMPANY (SA)

( * ) Notice: Subject to any disclaimer, the term of this patent is extended or adjusted under 35 U.S.C. 154(b) by 576 days.

This patent is subject to a terminal disclaimer.

(21) Appl. No.: 13/678,365

(22) Filed: Nov. 15, 2012

(65) Prior Publication Data

US 2013/0118808 A1 May 16, 2013

Related U.S. Application Data

(60) Provisional application No. 61/559,769, filed on Nov. 15, 2011, provisional application No. 61/694,576, filed on Aug. 29, 2012.

(51) Int. Cl.
*E21B 47/026* (2006.01)
*E21B 44/00* (2006.01)
(Continued)

(52) U.S. Cl.
CPC . *E21B 44/00* (2013.01); *E21B 7/04* (2013.01); *E21B 7/06* (2013.01); *E21B 44/02* (2013.01); *E21B 47/026* (2013.01); *E21B 47/091* (2013.01); *G01V 1/50* (2013.01)

(58) Field of Classification Search
CPC ....... E21B 44/02; E21B 47/091; E21B 47/02; E21B 47/02208; E21B 7/06
See application file for complete search history.

(56) References Cited

U.S. PATENT DOCUMENTS 5,182,760 A * 1/1993 Montgomery ................ 375/279
5,602,541 A 2/1997 Comeau et al.
(Continued)

FOREIGN PATENT DOCUMENTS

| EP | 718641 B1 | 8/2003 |
|---|---|---|
| WO | 2001021927 A | 3/2001 |
| WO | 2008004999 A1 | 10/2008 |

OTHER PUBLICATIONS

PCT Notification of Transmittal of the International Search Report and the Written Opinion of the International Searching Authority, or the Declaration; dated Jun. 18, 2013; International Application No. PCT/US2012/065242; International Filing Date: Nov. 15, 2012.

*Primary Examiner* — Giovanna C Wright
(74) *Attorney, Agent, or Firm* — Bracewell LLP; Constance Gall Rhebergen; Brad Y. Chin

(57) ABSTRACT

Disclosed is an apparatus, method, and program product for steering a drill bit within a pay zone in a lateral well. The method includes receiving acoustic signature data from an acoustic signal analyzing apparatus. The acoustic signature data includes an amplitude spectrum and one or more acoustic characteristics evaluated from an acoustic signal provided by a sensor attached to at least one of a drive shaft and a packing box of a drill rig, and generated in real-time as a result of rotational contact of the drill bit with encountered rock in the lateral well during drilling. The method further includes comparing the received real-time acoustic signature data to predetermined acoustic signatures determined for a plurality of rock samples, and identifying a lithology type of the rock being encountered by the drill bit based on the comparison. Further, the method includes steering the drill bit in a predetermined direction, in real-time, based on the identified lithology type of the rock, for maintaining the drill bit within the pay zone of the lateral well.

18 Claims, 16 Drawing Sheets

(51) Int. Cl.
  *E21B 7/06* (2006.01)
  *E21B 44/02* (2006.01)
  *G01V 1/50* (2006.01)
  *E21B 47/09* (2012.01)
  *E21B 7/04* (2006.01)

(56) References Cited

U.S. PATENT DOCUMENTS

| | | |
|---|---|---|
| 5,758,539 A | 6/1998 | Naville et al. |
| 5,877,996 A | 3/1999 | Krokstad et al. |
| 7,730,967 B2 | 6/2010 | Ballantyne et al. |
| 7,743,654 B2 | 6/2010 | Spross et al. |
| 7,894,300 B2 | 2/2011 | Hawthorn et al. |
| 2010/0038135 A1 | 2/2010 | Hummes et al. |
| 2010/0139981 A1* | 6/2010 | Meister et al. ............. 175/61 |
| 2010/0147510 A1 | 6/2010 | Kwok et al. |
| 2011/0108325 A1* | 5/2011 | Hartmann et al. ............. 175/26 |
| 2012/0217008 A1 | 8/2012 | Moos et al. |
| 2013/0118807 A1* | 5/2013 | Yang ............................. 175/24 |

* cited by examiner

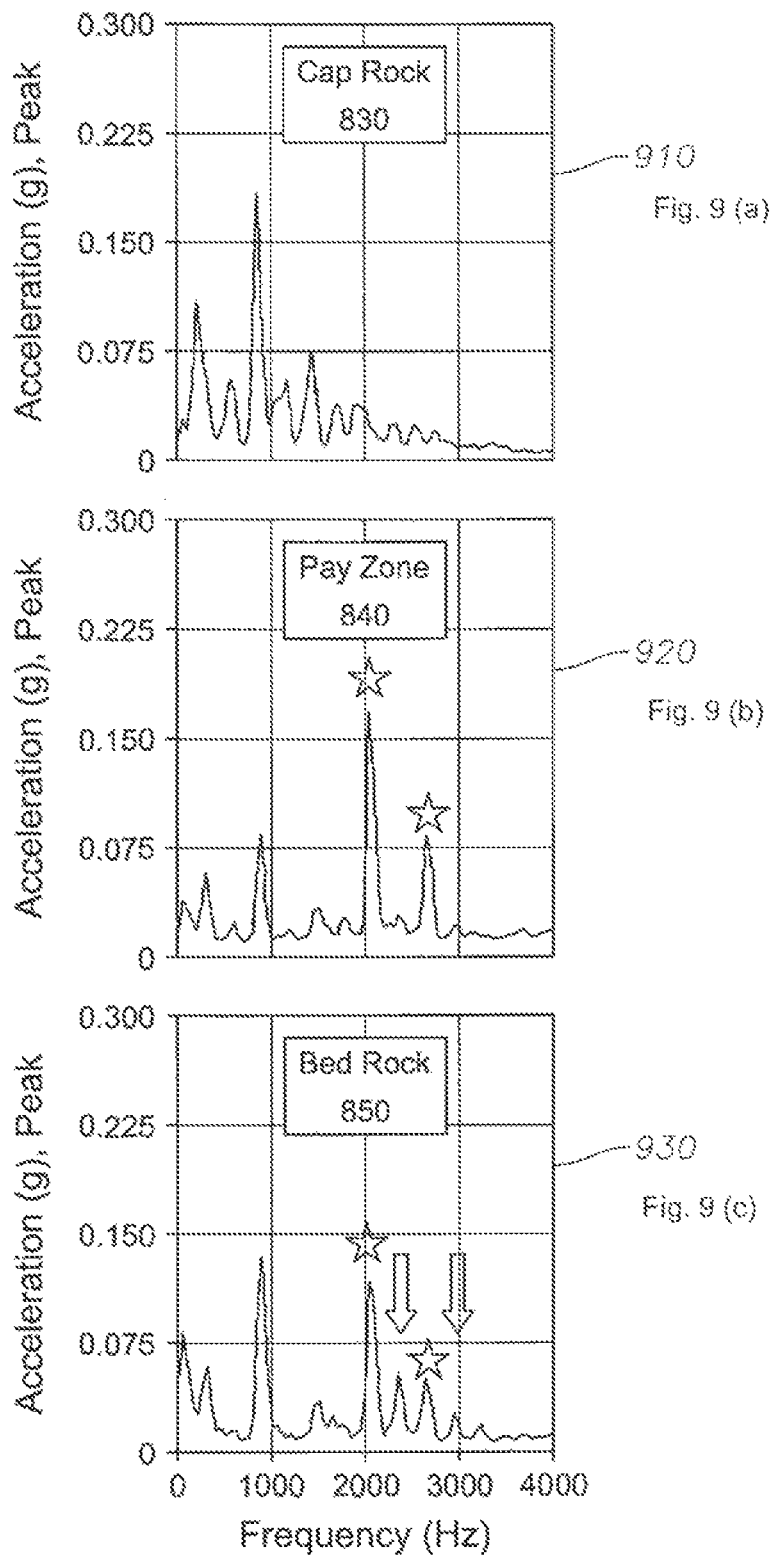

⊗ symbol represents the drill string

FIG. 14
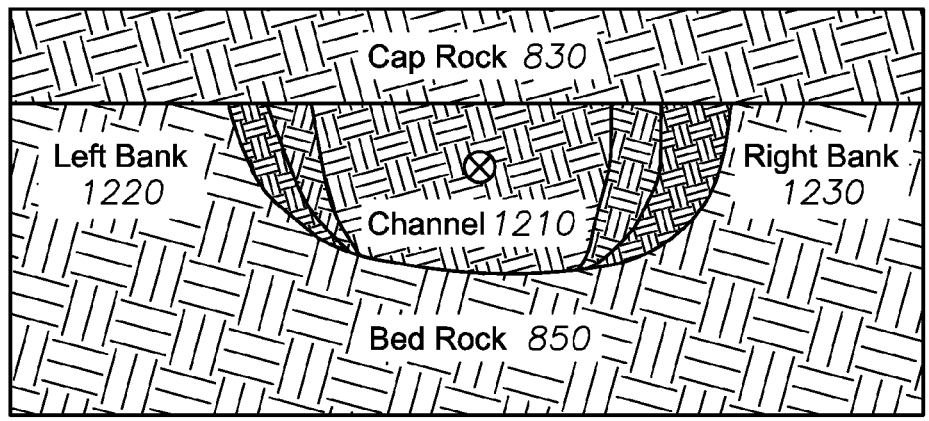
⊗ symbol represents the drill string
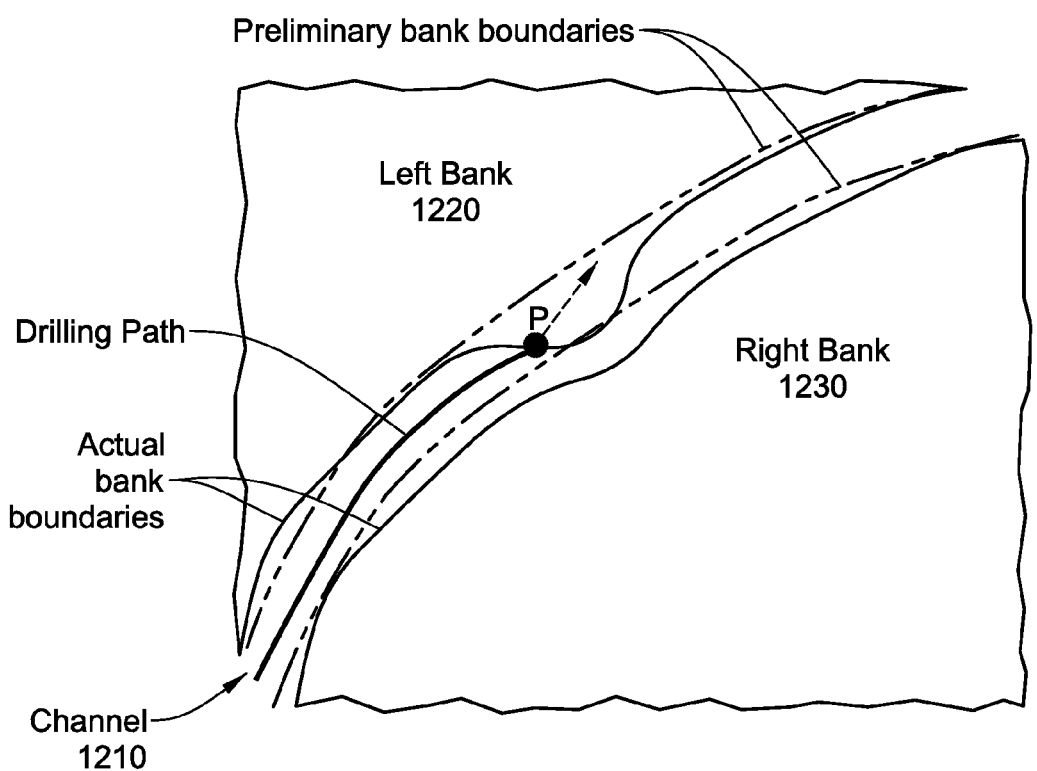
FIG. 15

METHODS FOR GEOSTEERING A DRILL BIT IN REAL TIME USING SURFACE ACOUSTIC SIGNALS

RELATED APPLICATIONS

This application is related to, and claims priority to, U.S. Provisional Patent Application No. 61/559,769, filed on Nov. 15, 2011, and U.S. Provisional Patent Application No. 61/694,576, filed on Aug. 29, 2012, the disclosures of which are incorporated herein by reference in their entirety.

BACKGROUND

1. Field of the Invention

Embodiments of the invention generally relate to hydrocarbon production, and more particularly, to drilling operations using well logging and measurement techniques for steering a drill bit within a pay zone in a lateral well using surface acoustic sensors generated by the drill bit drilling into rock.

2. Description of the Related Art

To increase oil or gas production of a well, an effective approach is to drill the well with a substantially lateral trajectory (e.g., a horizontal or lateral well) in a petroleum reservoir to increase the drainage area in the reservoir. It is therefore desired to maintain the drill bit within the targeted reservoir formation or pay zone during the horizontal or lateral drilling.

If the pay zone's geometry and distribution in space is precisely known, it will be easy to maintain the drill bit within the pay zone during lateral drilling. However, this is rarely the case. Geometry and distribution information of a pay zone before drilling, normally derived from seismic survey, offset wells, and local geological information, has significant error. Therefore, it can be extremely difficult to achieve good contact (i.e., high portion of a lateral section within a pay zone) if only the predefined geometry and distribution information of the pay zone is used to steer the drill bit through the pay zone in the lateral well, especially when the pay zone is thin.

To achieve better contact within the pay zone, geosteering can be employed. Traditionally, geosteering has been used to determine the position of the drill bit or drill string relative to the boundary between the pay zone and the surrounding rocks (e.g., overlying, underlying, and lateral layers) during drilling. The relative position of the drill bill is used to steer the drill bit within the pay zone, producing a lateral section having a maximum contact within the pay zone of the lateral well.

For example, measuring rock properties during drilling can provide the operator the ability to steer a drill bit in the direction of desired hydrocarbon concentrations. These types of systems typically utilize acoustic sensors located inside or adjacent to the drilling string to transmit acoustics associated with the drill bit encountering downhole rock formations (e.g., overlying, underlying, and lateral layers). Acoustic sensor data can be relayed to a measurement-while-drilling (MWD) or logging-while-drilling (LWD) tool, which either relays data via a wireline running inside the drilling string to the MWD/LWD tool at the surface, or through a borehole acoustic telemetry system which translates an acoustic signal through the drilling string or through the adjacent formation layers. Each methodology has its own set of disadvantages.

The wireline technique, although providing an arguably higher data rate, requires a wireline connected to the MWD/LWD tool, which must be deployed with the MWD/LWD tool. The acoustic telemetry methodology, albeit arguably the cheapest to implement, has a limited data rate, and thus, cannot support the transmission of raw data, requiring some form of lossy data reduction.

Many of the conventional MWD/LWD geosteering tools, some of which are configured to have a bit rate capability that can be sufficient to allow for the provision of raw data, only provide data describing encountered rock used in steering the drill bit that is behind the drill bit. For example, a measurement sensor of a conventional geosteering system is positioned a few dozen feet (e.g., 30 to 50 feet) behind the drill bit. Therefore, location of the boundary between the pay zone and the overlying rock (i.e., upper boundary), and the boundary between the pay zone and the underlying rock (i.e., lower boundary), are determined at the measurement sensor's position behind the drill bit. The drill bit is steered or maintained within the pay zone by keeping the drill string, at the sensor position, in the middle, or certain position between the upper and lower boundaries, of the pay zone. Because the measurement sensor is positioned behind the drill bit, conventional geosteering systems are unable to immediately notify an operator that the drill bit has already left the pay zone. Therefore, these tools are not true real-time tools.

In other conventional geosteering systems, drilling tools use either resistivity or sonic measurement to guide the drill bit during horizontal or lateral drilling. When resistivity measurements are employed, the upper and lower boundaries are computed from geological models using inversion techniques. A geological model can include predefined surrounding layers, predefined resistivity of the pay zone and the surrounding layers, and assumed thickness of the pay zone and the surrounding layers. In the inversion calculation, predicted tool response can be computed from a predefined geological model. The difference between the predicted tool response and the measured one can be calculated. If the difference is less than a preselected threshold, the assumed thicknesses of the pay zone and surrounding layers are treated as the "right" ones and the upper and lower boundaries are thus derived. Therefore, in this process, different combinations of layer thicknesses are searched until a right set is found. As rooted in the inversion techniques, the solution is not unique (i.e., different combinations of the thickness of pay zone and surrounding layers with different resistivity can result in the same or similar resistivity patterns). Thus, for the same measured resistivity pattern, different upper and lower boundaries can be determined.

When sonic measurements are employed, the upper and lower boundaries can be calculated from the travelling time of the reflected sonic waves and sonic velocity of the formation rocks. Sonic velocities of the formation rocks can be measured in-situ or determined prior to drilling.

Therefore, the aforementioned conventional geosteering systems are limited in that the formation used to steer the drill bit is derived at the location of the measurement sensor a few dozen feet behind the drill bit. Therefore, it is possible that although the position of the measurement sensor is in the pay zone, the drill bit may be drilling out of the pay zone. When it is determined that the drill bit is following the incorrect path at the measurement sensor location, a certain significant length of lateral section may have already been drilled out of the pay zone. When this happens, it may require a significant distance to adjust the drill bit back into the pay zone, resulting in a lateral section of the well with some non-productive fractions and thus reducing productivity of hydrocarbon production. As previously described, conventional geosteering systems are also limited by the use of resistivity techniques producing non-unique solutions, thereby reducing productivity of hydrocarbon production.

Some newer types of geosteering systems utilize a dedicated electronics unit and a segmented broadband cable protected by a reinforced steel cable positioned within the drill pipe to provide a faster communication capability. Such geosteering systems have been employed into conventional LWD tools to enhance the resolution of the logged information. However, the modified tools still measure rock properties 30-50 feet behind the drill. Furthermore, such geosteering systems require the provision of a segmented cable, whereby each segment connects to an inductive coil at the end of each separate drill pipe, which must survive the forces and environment encountered when connecting/running the drill pipe segments.

Other newer types of geosteering systems attempt to provide data for steering the drill bit, at least near-real-time, while still utilizing conventional borehole telemetry systems (i.e., having a relatively slow bit rate). These geosteering systems can include, for example, a downhole processor configured to provide downhole on-site processing of acoustic data to interpret the lithographic properties of the rock encountered by the drill bit through comparison of the acoustic energy generated by the drill bit during drilling with predetermined bit characteristics generated by rotating the drill bit in contact with a known rock type. The lithographic properties interpreted via the comparison are then transmitted to the surface via the conventional borehole telemetry system. Although providing data in a reduced form requiring only a bit rate speed, these conventional geosteering systems fail to provide raw data real-time which can be used for further analysis. It is nearly impossible to construct additional interpretation models or modify any interpretation models generated by this type of downhole processor. Further, they require additional and potentially expensive hardware that must be positioned between the drill bit and the drill.

Looking outside the field, some conventional seismic signal technology includes utilization of a vibration sensor positioned on a mud swivel to pick up the seismic signal generated by drill bit drilling the rocks. It is understood, however, that such a position does not provide for sufficient reception of the pilot signal. Another form of seismic signal technology provides a dedicated coupling connector encircling the drill pipe at a location near the mud swivel to carry vibration sensors. The strength of the seismic signal may be weakened due to its travelling through the connector to the vibration sensors. Besides requiring the addition of the coupling connector, which includes an annular stator/retaining ring enclosing an insulating rotor, such technology requires the signal to be transferred externally through a combination rotor-stator-brush wiper engagement methodology. Studies have demonstrated that signal accuracy is reduced by this transmission method. Both these two technologies are designed for rotary table type drill rigs which have almost been phased out by a new type of top drive drill rigs.

In order to improve the contact of the drill bit through the pay zone of the lateral well while drilling, and thus, the productivity of hydrocarbon production processes, apparatuses, computer program products, and methods are needed for steering the drill bit through the pay zone in real-time. More particularly, what is needed is (1) an apparatus specifically designed to fit top drive type drill rigs and having acoustic sensors strategically placed on the drill rig to maximally pick up the drilling sound which is generated by the drill bit biting the rocks (i.e., hereinafter referred to as "drilling acoustic signals"), (2) a signal transmitting system to transmit signals at high accuracy, and (3) a computer/processor positioned to receive acoustic signals from the acoustic sensors and configured to process the acoustic signals and evaluate the properties of the rock (e.g., lithology type and other petrophysical properties, as non-limiting examples) that is currently in contact with an operationally employed drilling bit, to utilize acoustic information contained within the acoustic signals and/or evaluated characteristics of the acoustic signals, and to generate instructions for steering the drill bit through the pay zone in real-time based on the derived rock type and properties. Also recognized is the need for methods of employing the apparatus.

SUMMARY

Embodiments of the invention are directed to an apparatus, computer program product, and methods for steering a drill bit through a vertical and lateral pay zone in real-time for well production in the oil and gas industry. In particular, in accordance with an embodiment of the invention, there is provided an apparatus for steering a drill bit within a pay zone in a lateral well. The apparatus includes a drill bit configured to drill through an encountered rock in the lateral well, and a sensor attached to at least one of a drive shaft and a packing box of a drill rig, and configured to receive real-time acoustic signature data indicating acoustic signatures of the rock being encountered by the drill bit. The apparatus further includes a processor configured to compare the received real-time acoustic signature data indicating acoustic signatures of the rock being encountered by the drill bit to predetermined acoustic signatures determined for a plurality of rock samples. The processor is further configured to identify a lithology type of the rock being encountered by the drill bit based on the comparison, and steer the drill bit in a predefined direction, in real-time, based on the identified lithology type of the rock, for maintaining the drill bit within the pay zone of the lateral well.

In accordance with another embodiment of the invention, there is provided a method for steering a drill bit within a pay zone in a lateral well. The method includes receiving acoustic signature data from an acoustic signal analyzing apparatus. The acoustic signature data includes an amplitude spectrum and one or more acoustic characteristics evaluated from an acoustic signal provided by a sensor attached to at least one of a drive shaft and a packing box of a drill rig, and generated in real-time as a result of rotational contact of the drill bit with encountered rock in the lateral well during drilling. The method further includes comparing the received real-time acoustic signature data to predetermined acoustic signatures determined for a plurality of rock samples, and identifying a lithology type of the rock being encountered by the drill bit based on the comparison. Further, the method includes steering the drill bit in a predetermined direction, in real-time, based on the identified lithology type of the rock, for maintaining the drill bit within the pay zone of the lateral well.

In accordance with another embodiment of the invention, there is provided a computer program product embodied on a computer readable storage medium. The computer program product is configured to control a processor to perform a process. The process includes receiving acoustic signature data from an acoustic signal analyzing apparatus. The acoustic signature data includes an amplitude spectrum and one or more acoustic characteristics evaluated from an acoustic signal provided by a sensor attached to at least one of a drive shaft and a packing box of a drill rig, and generated in real-time as a result of rotational contact of the drill bit with encountered rock in the lateral well during drilling. The process further includes comparing the received real-time acoustic signature data to predetermined acoustic signatures determined for a plurality of rock samples, and identifying a lithology type of the rock being encountered by the drill bit based on the comparison. Further, the process includes steering the drill bit in a predefined direction, in real-time, based on the identified lithology type of the rock, for maintaining the drill bit within the pay zone of the lateral well.

BRIEF DESCRIPTION OF DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIGS. 9(a), 9(b), and 9(c) are a set of graphs illustrating the amplitude spectrums of a cap rock, a pay zone, and a bed rock, respectively, of a rock being drilled by a drill bit, in accordance with an embodiment of the invention.

FIG. 14 is a cross sectional view of a channel pay zone having a material in a channel which gradually becomes muddy toward the banks of the channel, in accordance with an embodiment of the invention.

FIG. 15 is a perspective view of predefined, preliminary and actual bank boundaries of a channel, in accordance with an embodiment of the invention.

DETAILED DESCRIPTION

Figure 1:
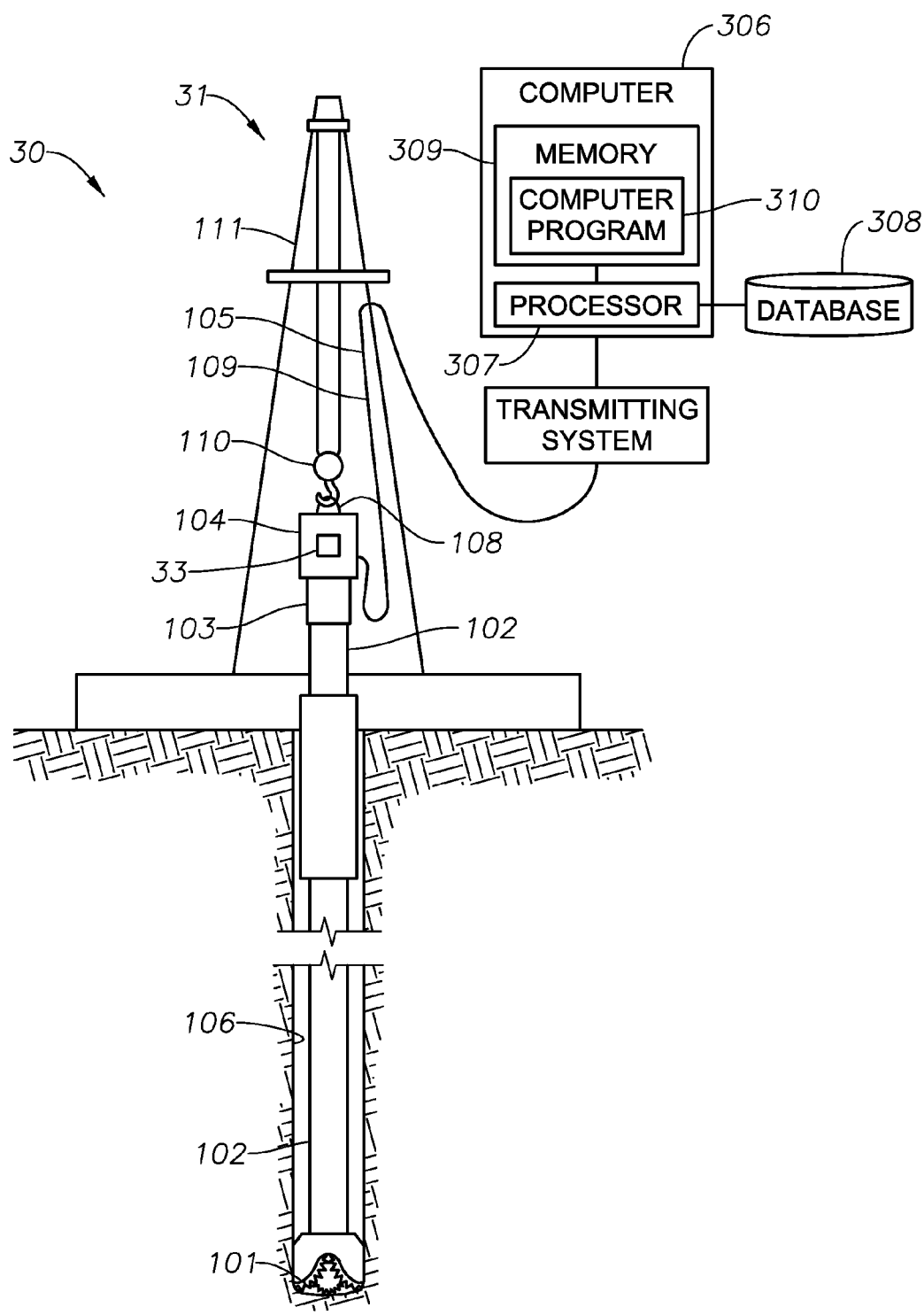
FIG. 1 is a partial perspective view and partial schematic diagram of a general architecture of an acoustic signal analyzing apparatus, or drill bit acoustic logging tool, for steering a drill bit through a pay zone in real-time based on acoustic signals generated by the drill bit drilling into rock, in accordance with an embodiment of the invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Generally, embodiments of the invention are directed to drill bit acoustic logging tools for vertically and laterally steering a drill bit. In particular, the tools employed use the drilling acoustic signals generated by the drill bit drilling into rock to derive acoustic properties, lithology or rock types, and rock physical properties (e.g., porosity, fracture density, water saturation, permeability, and hydrocarbon presence) (i.e., hereinafter collectively referred to as "petrophysical properties") to steer the drill bit in real time. The petrophysical properties derived from the drilling acoustic signals for the pay zone and the surrounding rocks may be first obtained from a vertical section of the well under drilling or from offset wells.

When drilling into different rock lithologies or the same rock lithology with different properties (e.g., porosity, water saturation, permeability, presence of fractures, etc.), the generated drilling acoustic signals emanating from the drill bit and the contacted rock are distinctly different. According to various embodiments of the invention, the drilling acoustic signals are transmitted upward along a drill string to a drive shaft, to bearings, to connected metal parts, and are then picked up by one or more acoustic sensors attached directly to the drive shaft or an extension of the drive shaft. The drilling acoustic signals recorded by the acoustic sensors (i.e., generally after amplification) are transmitted to a processor/processor assembly (hereinafter referred to as "processor"), which generates Fast Fourier Transformation (FFT) data (i.e., amplitude spectrums) by transforming the drilling acoustic signals using a FFT. The processor uses the amplitude spectrums to further evaluate additional acoustic characteristics (e.g., mean frequency, normalized deviation of the frequency, mean amplitude, etc.) of the drilling acoustic signals. The amplitude spectrums and the additional acoustic characteristics of the drilling acoustic signals will be collectively referred to as "acoustic signatures" hereinafter. The lithology type and petrophysical properties of the rock under drilling can be derived from the acoustic signature to horizontally and laterally steer the drill bit through the pay zone in the lateral well in real time.

According to certain embodiments of the invention, the drill bit is kept in, or steered within, the pay zone by continuously comparing the observed acoustic signatures under drilling in real time against known acoustic signatures of the pay zone and the surrounding rocks, as shown, for example, in FIGS. 9(a), 9(b), and 9(c), as will be described in more detail below. Since the acoustic signature of the pay zone is different from the acoustic signatures of the surrounding rocks, the driller will be able to instantaneously adjust the drilling direction of the drill bit when the drill bit drills out of the pay zone, allowing the driller to drill smoother lateral or horizontal wells with better contact with the production zone, detection of formation boundaries, and detection of fractured zones, which can advantageously result in better hydrocarbon productivity within the well.

According to various embodiments of the invention, the acoustic signatures of the pay zone and the surrounding rocks may be derived in three ways. First, the acoustic signatures may be derived by drilling through the pay zone and running drill bit acoustic logging before lateral drilling through the pay zone. Second, the acoustic signatures may be derived from the same rock formations from offset wells. Third, the acoustic signatures may be retrieved from a database which is constructed by accumulating acoustic signatures of various rocks under different depths.

According to various embodiments of the invention, the pay zone boundaries can also be estimated when steering the drill bit. For example, the upper boundary (i.e., the boundary between the pay zone and its cap rock formation, the lower boundary (i.e., the boundary between the pay zone and its underlying rock formation), and the lateral distribution for a channel pay zone, if available, may be used to roughly guide the drilling direction of the drill bit. The boundaries may also be derived from seismic survey, offset wells, and local geological information.

The acoustic signatures of the pay zone, the surrounding rocks, and the boundaries shall be hereafter collectively referred to as "prior information." As will be described in more detail below, the prior information can be updated during lateral drilling using the acoustic signatures outputted from the drill bit acoustic logging tools according to various embodiments of the invention.

As used herein, the term "pay zone" shall include a "lateral pay zone" and a "channel pay zone." The term "lateral pay zone" shall be used to describe a laterally extending rock formation with a varying vertical position at different locations. According to certain embodiments of the invention, the aim of geosteering through the lateral pay zone is to keep the drill bit following a vertical variation. The term "channel pay zone" shall be used to describe a rock formation that has a very limited lateral extension, but a very long axial extension. The position of this type of rock formation varies in both the lateral and vertical direction. According to certain embodiments of the invention, the aim of geosteering through the channel pay zone is to keep the drill bit following both the vertical and lateral variations. The term "up-down steering" shall be used to describe geosteering to keep the drill bit following a vertical variation. The term "left-right steering" shall be used to describe geosteering to keep the drill bit following a lateral variation.

FIG. 1 is a partial perspective view and partial schematic diagram of a general architecture of an acoustic signal analyzing apparatus, or drill bit acoustic logging tool, for steering a drill bit through a pay zone in real-time based on acoustic signals generated by the drill bit drilling into rock, in accordance with an embodiment of the invention. Specifically, FIG. 1 schematically illustrates an exemplary acoustic signals analyzing apparatus 30 for identifying rock properties in real-time during drilling, in accordance with one or more embodiments of the invention, which employs an acoustic signal recording and transmitting system (described in detail below) on a top drive drill rig 31. Note, the illustrated top drive drill rig 31 is but one example of a drill rig that can be modified to employ one or more embodiments of the acoustic signals analyzing apparatus 30 described below. Other drilling systems having a drive shaft can be utilized. Further, described below, are various embodiments of an acoustic signal recording system.

Figure 2:
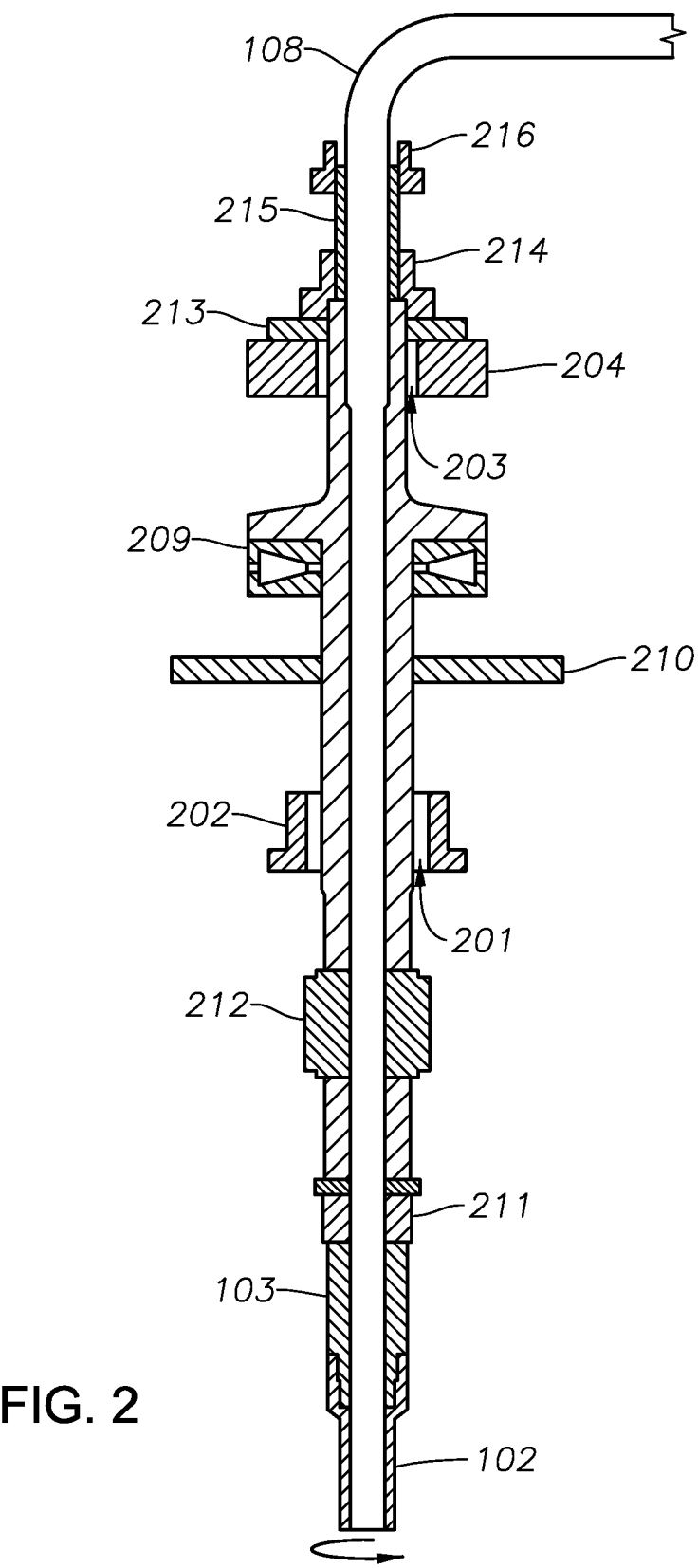
FIG. 2 is a sectional view of major components of an example of a top drive of a drill rig, in accordance with an embodiment of the invention.

FIG. 2 is a sectional view of major components of an example of a top drive of a drill rig, in accordance with an embodiment of the invention. Specifically, FIG. 2 shows a generic top drive 104 according to an embodiment of the drilling rig 31 shown in FIG. 1, illustrating the major components around the drive shaft 103. FIGS. 3-7 illustrate various transmitting system type-dependent acoustic sensor modifications to the top drive 104 positioned to maximally pick up the drill sounds of the drill bit 101 engaging rock during drilling operations.

Referring to FIGS. 3-7, as the acoustic sensors 33 (FIG. 1) of the acoustic signals recording and transmitting systems, as described herein, are positioned in strategic locations on the upper portion of the selected drill rig (e.g., top drive drill rig 31 in this example), a brief description of major parts of the drill rig 31 are described.

Referring again to FIG. 1, for a top drive drill rig 31, the top drive 104 is the central component of the rig 31. The top drive 104 is suspended in the derrick 111 by a traveling block 110. In the center of the top drive 104, there is a drive shaft 103 which is connected to the top pipe of the drill string 102 by threads. The top drive 104 rotates the drive shaft 103, the drill string 102, and the drill bit 101 to cut the rock at the bottom of the borehole 106. The power cable supplying electric power to the top drive 104 is protected inside service loops 105. Drilling mud is pumped into the borehole through a mud line 109, a goose neck 108, the drive shaft 103, and the drill string 102.

FIG. 2 shows a generic top drive 104 for an embodiment of the drilling rig 31 shown in FIG. 1, illustrating the major components around the drive shaft 103. As the drilling acoustic signals are recorded or otherwise intercepted on the drive shaft 103 or an extension of the drive shaft 103, according to various embodiments of the invention, the major components around the drive shaft 103 are briefly introduced to help to understand the system setup.

According to the illustrated embodiment of the top drive 104 for the embodiment of a drilling rig 31 shown in FIG. 1, the drive shaft 103 and the major components around it are suspended by the traveling block 110 (see FIG. 1) through a thrust bearing 209. The drive shaft 103 is a typical metal tube between a wash pipe 215 and the drill string 102. The drive shaft is kept vertical by a lower bearing 201, a rotary manifold 202, an upper bearing 203, and a bearing cup 204. The rotary manifold 202 is stationary relative to the drive shaft 103 during drilling. It does, however, rotate when making up pipes, breaking out pipes, or drill string tripping in and out of the borehole, the operations during which the drilling is suspended. In contrast, the upper bearing cup 204 is stationary all the time.

According to at least one embodiment, the drive shaft 103 is rotated by a motor (not shown) through a gear transmission system, in which a large gear 210 is connected to a medial portion of the drive shaft 103. At the bottom of the drive shaft 103, the upmost piece of pipe of the drill string 102 threads therein. The motor rotates the drill string 102 and the drill bit 101 (FIG. 1) through rotation of the drive shaft 103. At the top, the drive shaft 103 is connected to the washpipe 215 by a rotatable packing box 214, which seals the connection between the drive shaft 103 and the washpipe 215. The packing box 214 is screwed on the top of the drive shaft 103 and rotates together with the drive shaft 103. A stationary seal 213 is located below the packing box 214. A holding nut 216 connects the washpipe 215 to the goose neck 108. A manual valve 211 and a remotely controlled valve 212 (also known as Lower Well Control Valve, LWCV) are provided to control blow out.

Figure 3:
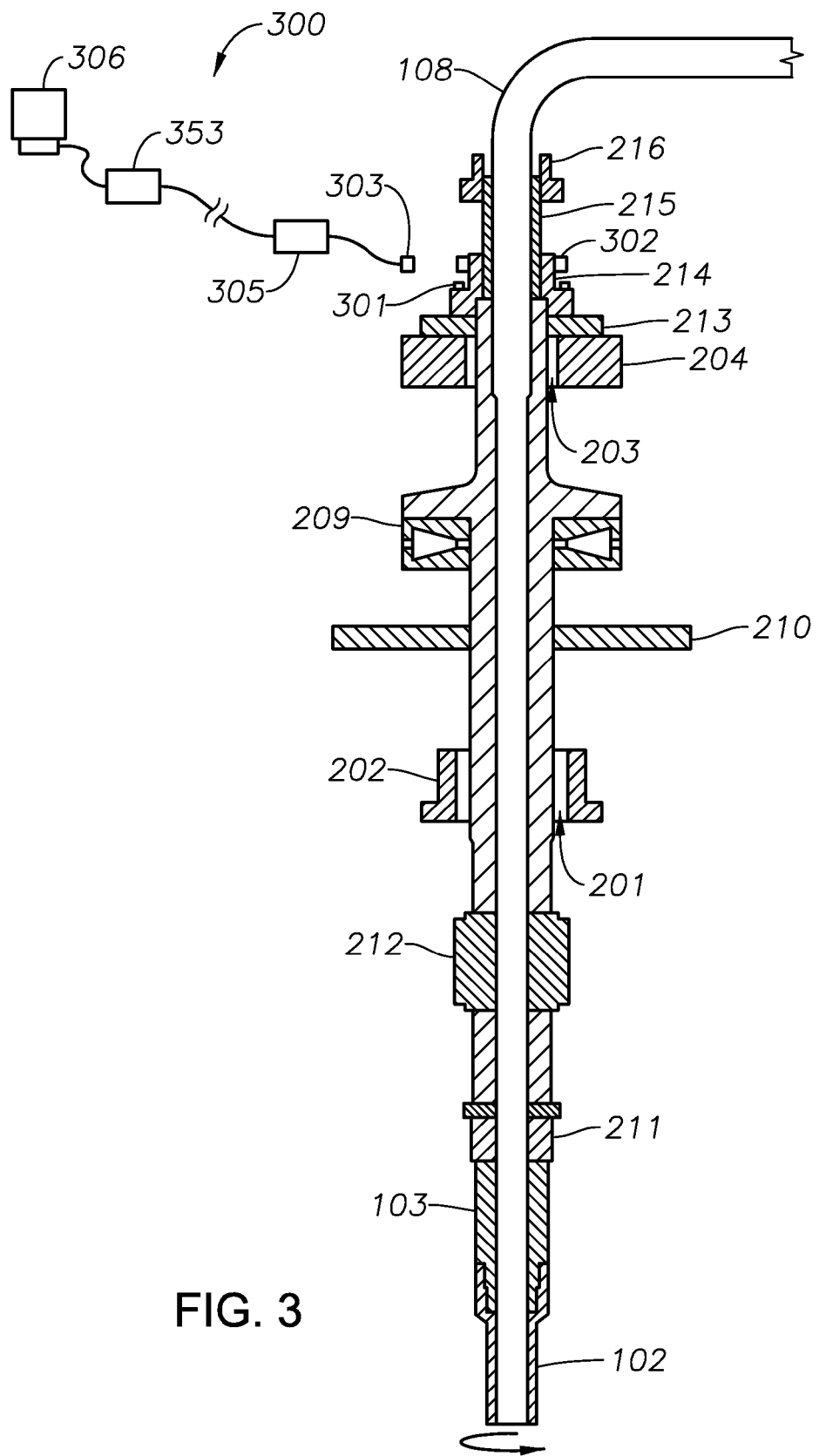
FIG. 3 is a partial sectional view and partial schematic diagram of major components of an inductive telemetry system, in accordance with an embodiment of the invention.
Figure 4:
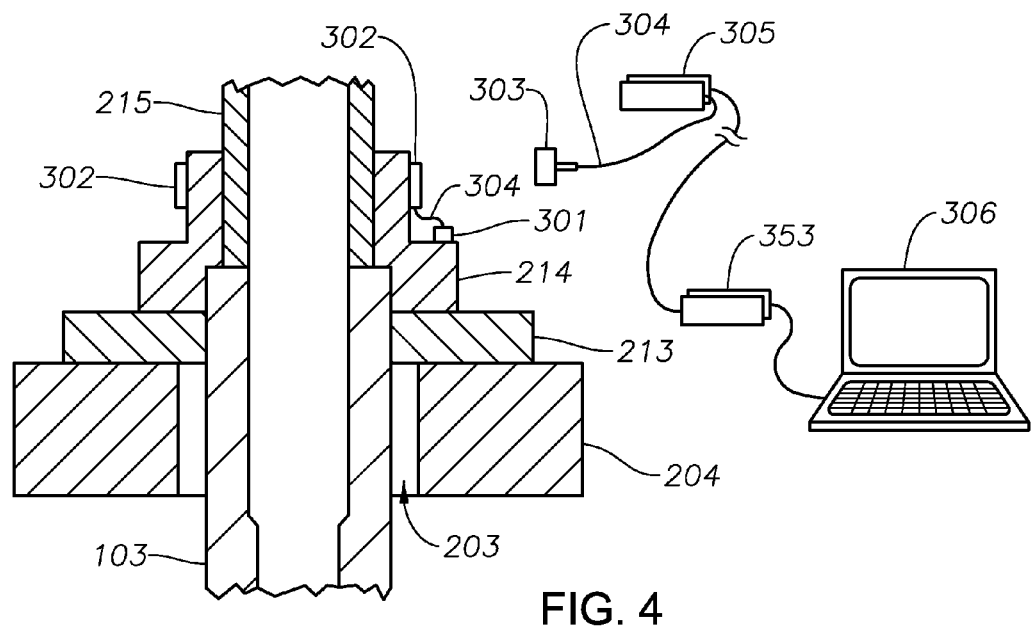
FIG. 4 is a partial sectional view and partial schematic diagram of a portion of the inductive telemetry system, as shown in FIG. 3, in accordance with an embodiment of the invention.
Figure 5:
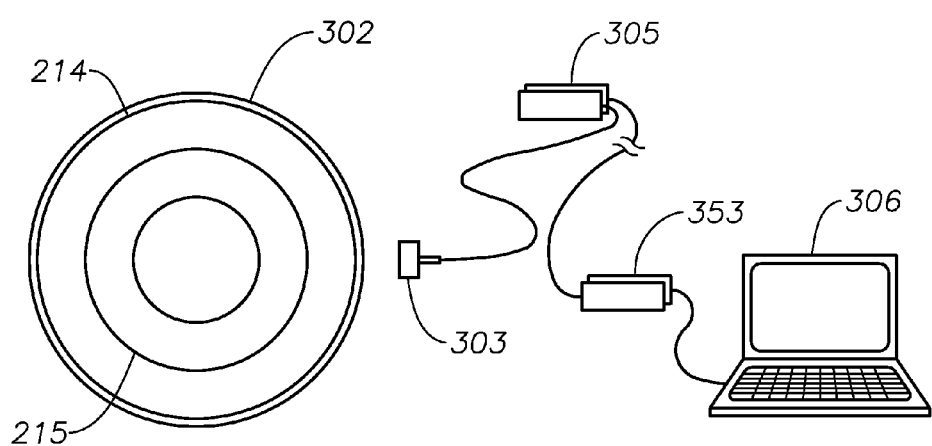
FIG. 5 is a plane view of a portion of the inductive telemetry system and partial schematic diagram of the inductive telemetry system, as shown in FIG. 4, in accordance with an embodiment of the invention.

FIGS. 3-5 illustrate the major components of an acoustic signal recording and transmitting system 300 interfaced with components of a top drive drill rig 31 (FIG. 1), in accordance with various embodiments of the invention. According to at least one embodiment, one or more acoustic sensors 301 are attached to the packing box 214, which is screwed on top of the drive shaft 103 and rotates with the drive shaft 103. Although a plurality of acoustic sensors 301 are typically employed, for illustrative purposes, only a single acoustic sensor 301 is shown in the figures. The acoustic sensor 301 rotates together with the drive shaft 103. An amplifier is either built-in or is connected to the acoustic sensor 301. The received acoustic signals are amplified first before transmission.

According to at least one embodiment, the acoustic signal recording and transmitting system 300 includes an inductive telemetry system, which includes, for example, an induction loop 302, a pickup 303 used to transmit the acoustic sensor signal from the acoustic sensor 301 to a receiver, a receiver 305 that transmits acoustic sensor data to a data acquisition unit 353, and the data acquisition unit 353, which samples the acoustic signal and digitizes the sampled signal and then sends the digitized signal (i.e., data) to a computer 306. According to an embodiment of the invention, as shown in FIG. 1, the computer 306 includes a programmable electronic processor 307, optionally connected to a database 308. Other configurations are, however, within the scope of the present invention. The computer 306 can include various components such as, for example, an analog-to-digital converter (not shown), a processing section (not shown), memory 309 contained within, carried by, or otherwise operably coupled with the processing section, acoustics characteristics analyzing program product/firmware 310 stored therein, which can adapt the computer 306 to analyze the acoustic signatures of the rock being drilled by the drill bit 101 for steering the drill bit 101 in real time through the pay zone (i.e., to perform program functions for up-down steering and left-right steering of the drill bit 101 through the well), as will be described in more detail below.

According to certain embodiments of the invention, the computer 306 can be in the form of a personal computer or in the form of a server or server farm serving multiple user interfaces or other configurations known to those skilled in the relevant art (i.e., a non-transitory, computer-readable storage medium). The computer program product/firmware 310 can be implemented in hardware, software, or a hybrid implementation. For example, the computer program product/firmware 310 can be in the form of microcode, programs, modules, routines, and symbolic languages that are in operative communication with one another, and which provide a specific set or sets of ordered operations that control the functioning of the hardware and direct its operation, as known and understood by those skilled in the relevant art. The computer program product/firmware 310, according to an embodiment of the invention, need not reside in its entirety in volatile memory, but can be selectively loaded, as necessary, according to various methodologies as known and understood by those skilled in the relevant art. Still further, at least portions of the computer program product/firmware 310 can be stored in memory of the computer 306, when so configured.

In accordance with an embodiment, the induction loop 302, in conjunction with pickup 303, serves to supply electric power to the acoustic sensor 301. Electric power is supplied by electromagnetic coupling between the induction loop 302 and the pickup 303 as will be understood by one of ordinary skill in the relevant art. Note, in accordance with one embodiment, the length of cable/wire between the pickup 303 and receiver 305 is generally limited to keep the acoustic signals at a perceptible level. At receiver 305, the signals are amplified and then transmitted over a long distance to the data acquisition unit 353.

According to the embodiments shown in FIGS. 3 and 4, the induction loop 302 is wrapped around the packing box 214 and rotates together with the packing box 214. The acoustic sensor 301 is connected the induction loop 302 by an electronic wire 304. The pickup 303, which provides a stationary interface between the stationary receiver 305 and the rotating induction loop 302, is correspondingly not attached to the packing box 204 and does not rotate. The connection (e.g., the electronic wire) between the receiver 305 and the data acquisition unit 353 is protected inside the service loop 105 (FIG. 1).

Note, although attachment of the acoustic sensor 301 to the packing box 214 can enhance ease of installation and can provide a location to maximally pick up the drill sounds of the drill bit 101 engaging rock during drilling operations, the acoustic sensor 301 and the corresponding components of the inductive telemetry system, according to various embodiments, are installed at other locations that provide at least a near maximal pick up of the drill sounds of the drill bit 101 engaging rock during drilling operations. This can generally be accomplished as long as the acoustic sensor or sensors 301 are attached directly to the drive shaft 103 or to a direct extension of the drive shaft 103 at a location where the induction loop 302 can be wrapped around the drive shaft 103 or drive shaft extension and be connected to the sensors 301 at a position adjacent thereto. Note also, although different types of acoustic sensors 301 may be used, such as, for example, accelerometers, measurement microphones, contact microphones, etc., when microphones are used to receive/record the drilling acoustic signals from the drill bit 101 transmitting through the drill string 102 and the drive shaft 103, they should be acoustically insulated with good insulating material to block the ambient noise emanating from nearby components of the drilling rig 31. As such, accelerometers have been found to provide the best ease of installation. Additionally, microphones tend to have a higher high-frequency attenuation than that of accelerometers.

In operation, when the drilling acoustic signals are generated at the drill bit 101, they transmit upward through the drill string 102, drive shaft 103 and then the packing box 214. They are picked up by the acoustic sensors 301 attached directly to the packing box 214. The drilling acoustic signals picked up by the acoustic sensor 301 are amplified. The amplified acoustic signals are transmitted to the induction loop 302. From there, they are transmitted to the pickup 303 by induction. The acoustic signals are then transmitted from the pickup 303 to the receiver 305 through the electronic wire 304. The received signals are transmitted to the data acquisition unit 353, via the electronic wire, which samples the acoustic signal and digitizes the sampled signal and then transmits the digitized signal (i.e., data) to the computer 306. According to an embodiment of the invention, the computer 306 includes a programmable electronic processor 307, optionally connected to a database 308. Other configurations are, however, within the scope of the present invention. The computer 306 can include various components such as, for example, an analog-to-digital converter (not shown), a processing section (not shown), memory 309 contained within, carried by, or otherwise operably coupled with the processing section, and acoustics characteristics analyzing program product/firmware 310 stored therein, which can adapt the computer 306 to analyze the acoustic signatures of the rock being drilled by the drill bit 101 for steering the drill bit 101 in real time through the pay zone (i.e., to perform program functions for up-down steering and left-right steering of the drill bit 101 through the well), as will be described in more detail below.

According to certain embodiments of the invention, the computer 306 can be in the form of a personal computer or in the form of a server or server farm serving multiple user interfaces or other configurations known to those skilled in the relevant art (i.e., a non-transitory, computer-readable storage medium). The computer program product/firmware 310 can be implemented in hardware, software, or a hybrid implementation. For example, the computer program product/firmware 310 can be in the form of microcode, programs, modules, routines, and symbolic languages that are in operative communication with one another, and which provide a specific set or sets of ordered operations that control the functioning of the hardware and direct its operation, as known and understood by those skilled in the relevant art. The computer program product/firmware 310, according to an embodiment of the invention, need not reside in its entirety in volatile memory, but can be selectively loaded, as necessary, according to various methodologies as known and understood by those skilled in the relevant art. Still further, at least portions of the computer program product/firmware 310 can be stored in memory of the computer 306, when so configured.

As will be described in more detail later, the digitized acoustic signals received by the computer 306 are first transformed into frequency domain using FFT. The frequency distribution data are further evaluated for acoustic characteristics. The frequency distribution, and/or characteristics of the drilling acoustic signals may then be used to identify lithology and to evaluate petrophysical properties of the rock that is currently in contact with an operationally employed drilling bit, to utilize acoustic information contained within the acoustic signals and/or evaluated characteristics of the acoustic signals, and to generate instructions for steering the drill bit 101 through the pay zone in real-time based on the derived rock type and properties, as will be described in more detail below.

Figure 6:
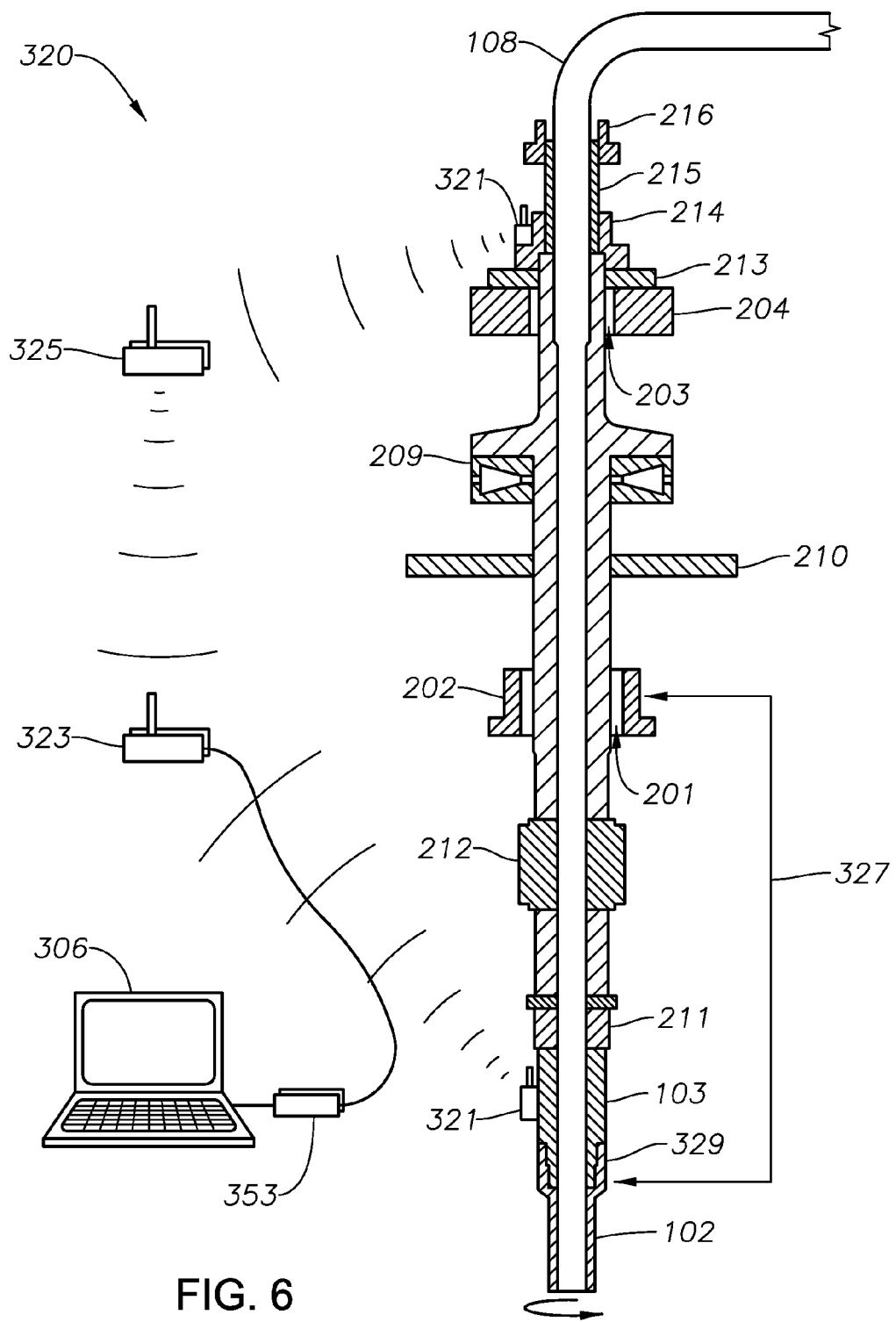
FIG. 6 is a partial section view and partial schematic diagram of major components of a wireless telemetry system, in accordance with an embodiment of the invention.

FIG. 6 is a partial section view and partial schematic diagram of major components of a wireless telemetry system, in accordance with an embodiment of the invention. Specifically, FIG. 6 illustrates the major components of an acoustic signal recording and transmitting system 320 interfaced with components of a top drive drill rig 31 (FIG. 1), in accordance with another embodiment of the invention. In accordance with this embodiment, a wireless acoustic sensor 321 is attached to the drive shaft 103 and to the packing box 214, respectively, and rotates together with the drive shaft 103. Although multiple acoustic sensors 321 are typically employed, for illustrative purposes, only two separately positioned acoustic sensors 321 are shown in this figure. Note, different types of acoustic sensors 321 may be used such as, for example, accelerometers, measurement microphones, contact microphones, etc. Accelerometers, however, have been found to function the best as they have less high-frequency attenuation and are less affected by ambient noise then other types of acoustic sensors, thus reducing installation requirements. When microphones are used to pick up the acoustic signals, for example, they generally need to, or at least should, be acoustically insulated with good insulating material to block the noise from drilling rig 31.

In accordance with some embodiments, each acoustic sensor 321 includes or is connected to a wireless transmitter (not shown). Between the acoustic sensor 321 and the wireless transmitter, there is a signal amplifier (not shown), which is either a built-in type or a separate unit. The acoustic sensor 321, the amplifier, and the wireless transmitter are collectively termed as a "wireless acoustic sensor" arranged as one unit, separate units, or a combination thereof.

According to certain embodiments, the acoustic signal recording and transmitting system 320 includes a wireless telemetry system, which includes, for example, the wireless acoustic sensors 321, a gateway or other appropriate type of receiver 323, and optionally a data acquisition unit 353. The wireless telemetry system can also include one or more repeaters 325, if needed, positioned between the wireless acoustic sensors 321 and the receiver unit 323 to relay the data from the acoustic sensors 321, if the distance between the wireless acoustic sensors 321 and the receiver unit 323 exceeds the maximum specified distance and/or to improve signal strength.

According to the embodiment shown in FIG. 6, one or more wireless acoustic sensors 321 are attached to the packing box 214 to maximally pick up the drill sounds of the drill bit 101 engaging rock during drilling operations. Alternatively, one or more wireless sensors 321 are attached to the drive shaft 103. A preferred location for the wireless acoustic sensors 321 to be attached to the drive shaft 103 in the drill rig 31, found to provide at least substantially maximum pick up of the drill sounds of the drill bit 101 engaging rock during drilling operations with an acceptable level of ambient noise, is the location 327 between the rotary manifold 202 and the joint 329 between the drive shaft 103 and the drill string 102. FIG. 6 shows a convenient location just below the manual valve 211 for the wireless acoustic sensors 321, in accordance with an embodiment of the invention.

In operation, when the drilling acoustic signals are generated at the drill bit 101, they transmit upward through the drill string 102 and then the drive shaft 103, and are picked up by the wireless acoustic sensors 321 attached directly to the drive shaft 103 and/or the packing box 214. The drilling acoustic signals picked up by the wireless acoustic sensors 321 are digitized by the wireless acoustic sensors 321 before they are transmitted to the receiving unit 323, if there is a built-in or external data acquisition unit in or coupled to the wireless acoustic sensor 321, or the drilling acoustic signals are digitized by a built-in or external data acquisition unit in the receiving unit 323 before they are transmitted to the computer 306 through an electrical or optical cable. The digitized acoustic signals (i.e., data) transmitted to the computer 306 are first transformed into the frequency domain using FFT. The frequency distribution data are further evaluated for acoustic characteristics. The frequency distribution, and/or characteristics of the drilling acoustic signals may then be used to identify lithology and to evaluate petrophysical properties of the rock that is currently in contact with an operationally employed drilling bit, to utilize acoustic information contained within the acoustic signals and/or evaluated characteristics of the acoustic signals, and to generate instructions for steering the drill bit 101 through the pay zone in real-time based on the derived rock type and properties, as will be described in more detail below.

Figure 7:
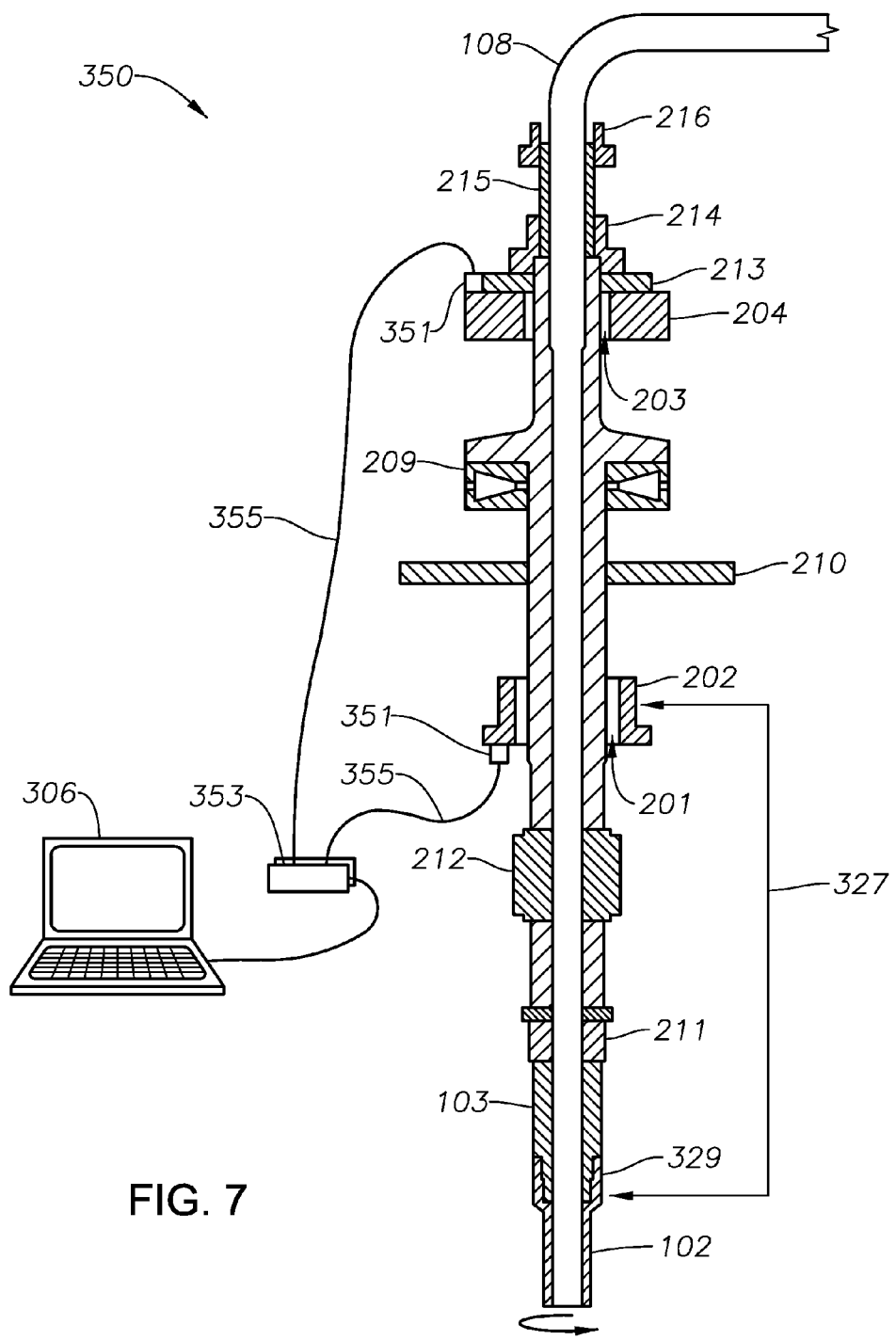
FIG. 7 is a partial section view and partial schematic diagram of major components of a wired telemetry system, in accordance with an embodiment of the invention.

FIG. 7 is a partial section view and partial schematic diagram of major components of a wired telemetry system, in accordance with an embodiment of the invention. Specifically, FIG. 7 illustrates the major components of an acoustic signal recording and transmitting system 350 interfaced with components of a top drive drill rig 31 (FIG. 1), in accordance with an embodiment of the invention. In accordance with this embodiment, one or more acoustic sensors 351 are attached to metal parts which are in close, good contact with the drive shaft 103, for example, through bearings for maximally picking up the drill sound.

According to one embodiment, the acoustic signal recording and transmitting system 350 includes wired transmitting system, which includes, for example, a data acquisition unit 353 and an electronic wire or other conductor 355 connected to each acoustic sensor 351 and to the data acquisition unit 353. The electronic wires 355 extending between the acoustic sensors 351 and the data acquisition unit 353 are arranged and secured inside the service loop 105. Further, an amplifier is (not shown) either built-in or connected to each acoustic sensor 351. The received acoustic signals are amplified first before transmission.

As the rotary manifold 202 and the upper bearing cup 204 are in close, good contact with the drive shaft 103 through bearings, according to an embodiment of the invention, one or more sets of acoustic sensors 351 are attached on either of them to at least substantially maximally pick up the drilling acoustic signals. As the upper bearing cup 204 stays stationary all the time, however, it is more management-wise and installation-wise convenient to connect the one or more sets of the acoustic sensors 321 to the upper bearing cup 204.

Note, although a plurality of acoustic sensors 351 are typically employed in each location, for illustrative purposes, only a single acoustic sensor 351 at each location is shown in this figure. Note also, although different types of acoustic sensors 351 may be used such as, for example, accelerometers, measurement microphones, contact microphones, etc., accelerometers have been found to function the best as they have less high-frequency attenuation and are less affected by ambient noise then other types of acoustic sensors, thus reducing installation requirements. When microphones are used to pick up the acoustic signals, for example, they generally need to or at least should be acoustically insulated with good insulating material to block the noise from drilling rig 31.

In operation, when the drilling acoustic signals are generated at the drill bit 101, they transmit upward through the drill string 102 and then the drive shaft 103. Since the rotary manifold 202 and the upper bearing cup 204 are in close, good contact with the drive shaft 103 through bearings, the drilling acoustic signals can be picked up at least near maximally at these two locations by the acoustic sensors 351. The drilling acoustic signals picked up by the drilling acoustic sensors 351, after being amplified, are sent through electronic wires 355 to the data acquisition unit 353. The drilling acoustic signals are digitized by the data acquisition unit 353 and then sent to the computer 306 for analysis. The digitized acoustic signals are first transformed into frequency domain using FFT. The frequency distribution data are further evaluated for acoustic characteristics. The frequency distribution, and/or characteristics of the drilling acoustic signals are then be used to identify lithology and to evaluate petrophysical properties of the rock that is currently in contact with an operationally employed drilling bit, to utilize acoustic information contained within the acoustic signals and/or evaluated characteristics of the acoustic signals, and to generate instructions for steering the drill bit 101 through the pay zone in real-time based on the derived rock type and properties, as will be described in more detail below.

Figure 8:
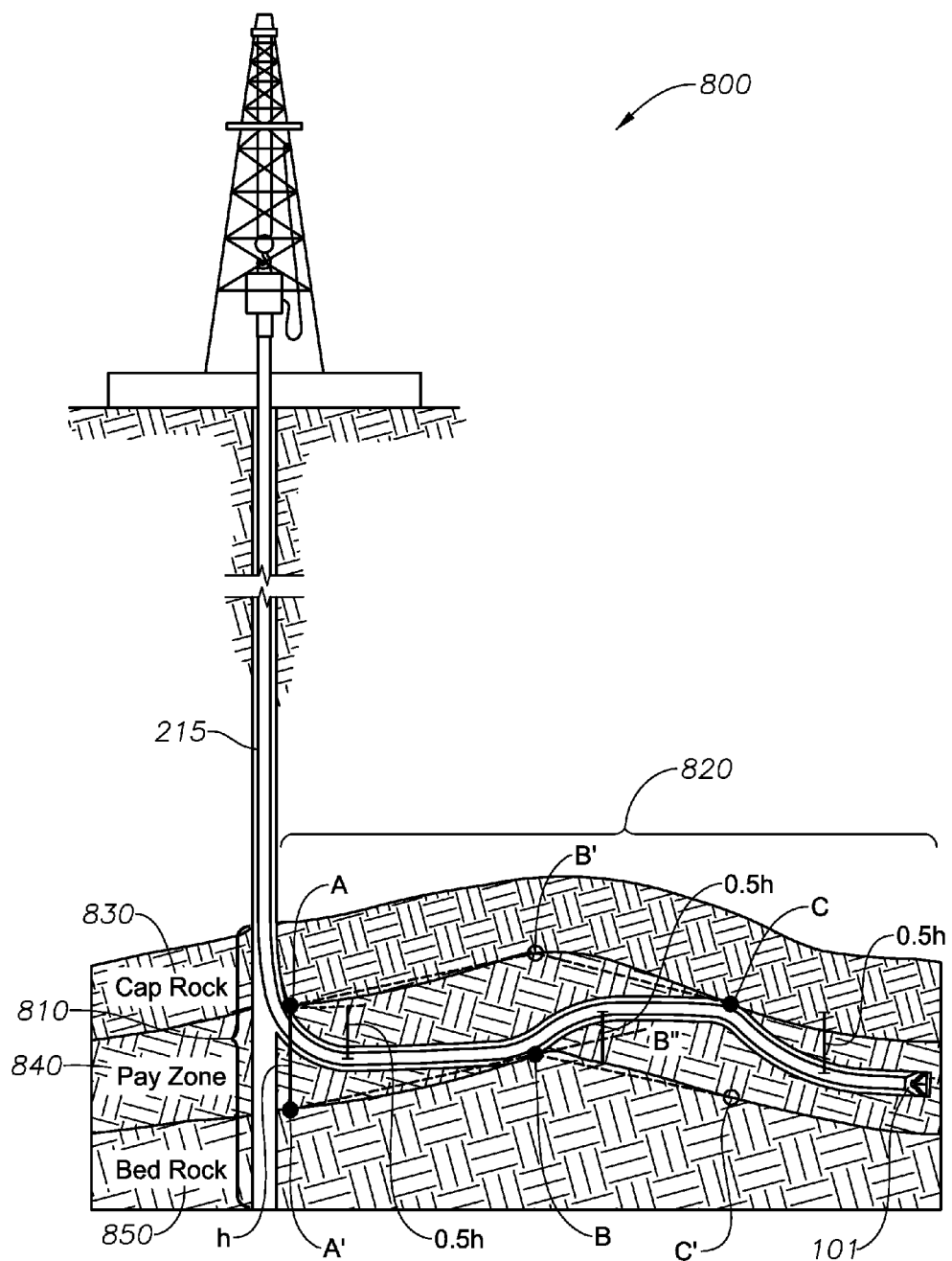
FIG. 8 is a perspective view of the acoustic signal analyzing apparatus, as shown in FIG. 1, for steering the drill bit within a lateral pay zone using acoustic signals generated by the drill bit drilling into rock, in accordance with an embodiment of the invention.

FIG. 8 is a perspective view of the acoustic signal analyzing apparatus, as shown in FIG. 1, for steering the drill bit within a lateral pay zone using acoustic signals generated by the drill bit drilling into rock, in accordance with an embodiment of the invention.

Figure 10A:
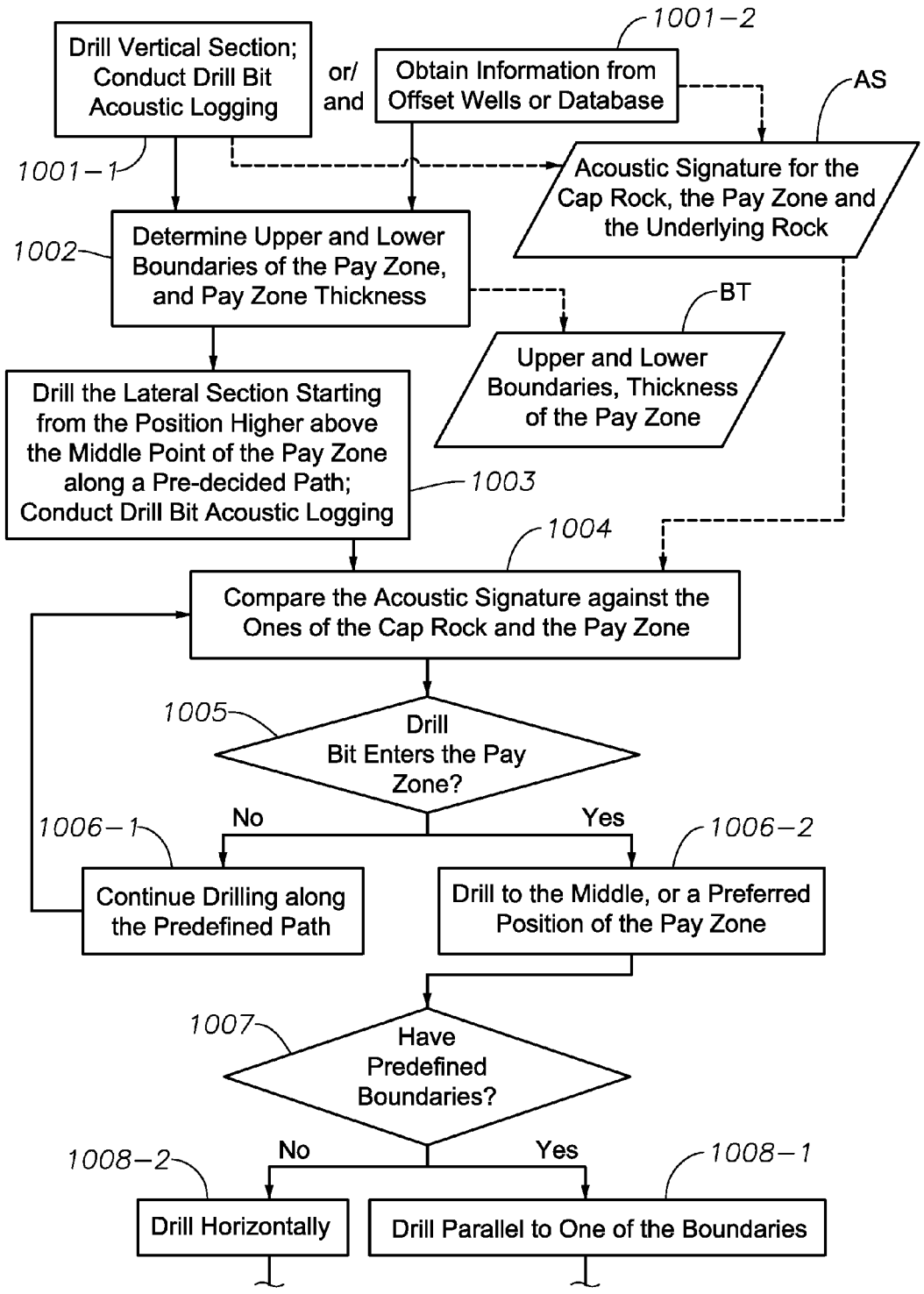
FIGS. 10(a) and (b) are flow diagrams of a method performed by the acoustic signal analyzing apparatus, as shown in FIGS. 1 and 8, for up-down steering a drill bit through a lateral pay zone, in accordance with an embodiment of the invention.

Up-Down Steering a Drill Bit Through a Lateral Pay Zone:

FIGS. 8, 9(a), 9(b), 9(c), and 10(a) and (b) illustrate a procedure for steering a drill bit through a lateral pay zone using the geosteering system shown in FIG. 1, in accordance with an embodiment of the invention. Specifically, FIG. 8 is a perspective view of the acoustic signal analyzing apparatus, as shown in FIG. 1, for steering the drill bit within a lateral pay zone using acoustic signals generated by the drill bit drilling into rock, in accordance with an embodiment of the invention. FIGS. 9(a), 9(b), and 9(c) are a set of graphs illustrating the amplitude spectrums of a cap rock, a pay zone, and a bed rock, respectively, of a rock being drilled by a drill bit, in accordance with an embodiment of the invention. FIGS. 10(a) and (b) are flow diagrams of a method performed by the acoustic signal analyzing apparatus, as shown in FIGS. 1 and 8, for up-down steering a drill bit through a lateral pay zone, in accordance with an embodiment of the invention.

Figure 10B:
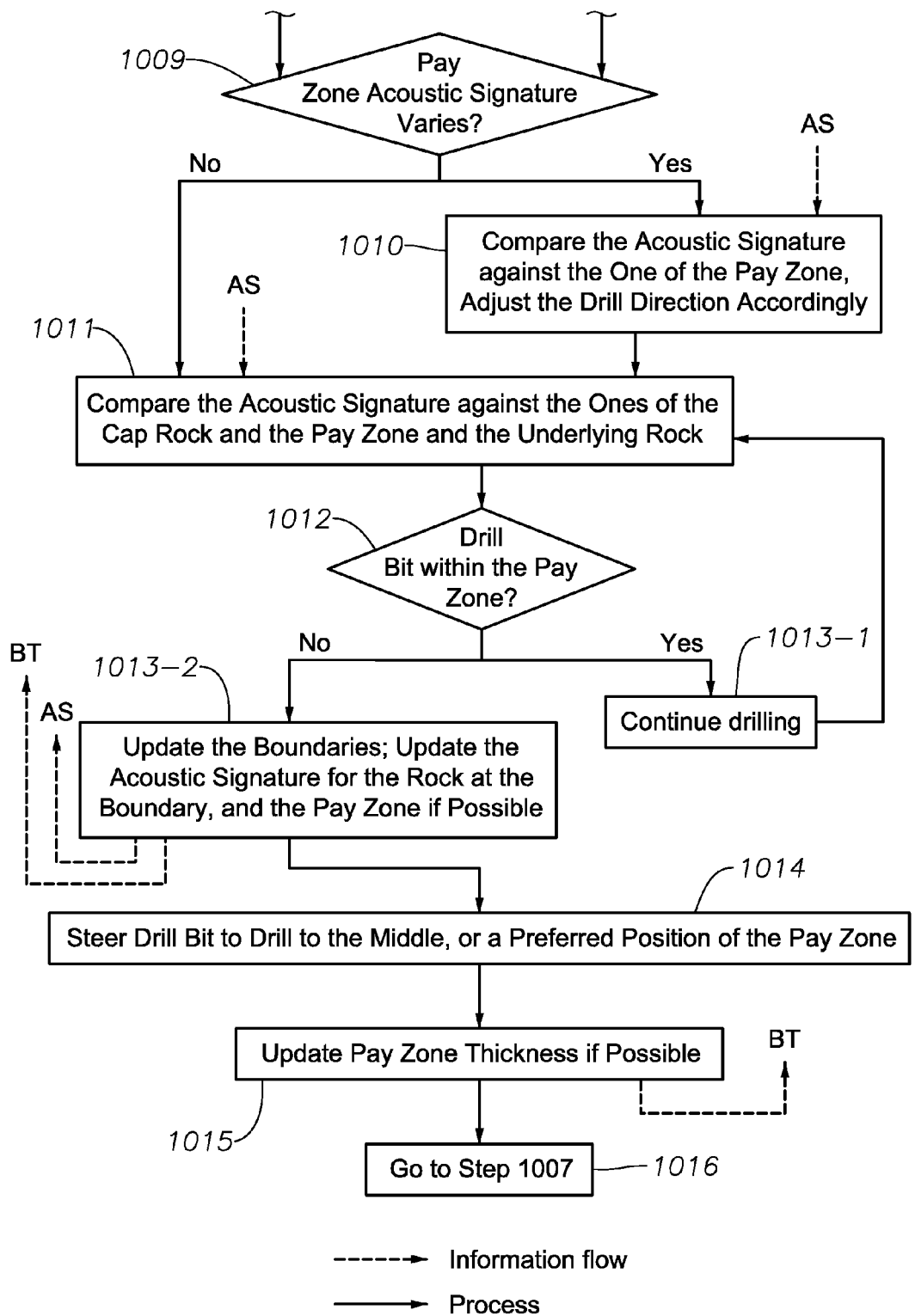

In accordance with various embodiments of the invention, there may be two scenarios of contrast between the acoustic signatures of the pay zone 840 and its overlying (hereinafter referred to as "cap rock 830") or underlying rock (hereinafter referred to as "bed rock 850"), as shown in FIG. 8. For example, the acoustic signature between the cap rock 830, the pay zone 840, and the bed rock 850 can either gradually or suddenly change. The procedure described below, as shown in FIGS. 8-10, shall be understood to cover both of the aforementioned scenarios, whereby the lithology of the pay zone 840 is assumed to change, for example, gradually downward towards the bed rock 850, and to suddenly change when crossing the upper boundary into the cap rock 830. Because of the sudden change in lithology between the cap rock 830 and the pay zone 840, the amplitude spectrum 920 (hereinafter used interchangeably with "acoustic signature 920") of the pay zone 840 may be totally different from the amplitude spectrum 910 (hereinafter used interchangeably with "acoustic signature 910") of the cap rock 830, as shown in FIGS. 9(a), 9(b), and 9(c). In accordance with certain embodiments of the invention, when the drill bit 101 drills out of the pay zone 840 into the cap rock 830, the observed amplitude spectrum will change suddenly from the amplitude spectrum 920 (hereinafter used interchangeably with "acoustic signature 920") to the amplitude spectrum 910, as shown in FIGS. 9(a), 9(b), and 9(c). In contrast, when drilling from the pay zone 840 downward into the bed rock 850, the amplitude spectrum gradually changes from the amplitude spectrum 920 to the amplitude spectrum 930 (hereinafter used interchangeably with "acoustic signature 930"), with picks marked by a star gradually shrinking and new picks marked by an arrow gradually rising, as further shown in FIGS. 9(a), 9(b), and 9(c).

As shown in FIG. 10, in accordance with an embodiment of the invention, the acoustic signatures 910, 920, 930 of the cap rock 830, the pay zone 840, and the bed rock 850, respectively, of a well (AS) can be derived, at step 1001-1, by (1) conducting drill bit acoustic logging, i.e., applying the acoustic signal analyzing apparatus to obtain the acoustic signature, while drilling a vertical section 810 of the well (FIG. 8), or (2) obtaining, at step 1001-2, the acoustic signatures 910, 920, 930 from offset wells or a database. As shown in FIGS. 9(a) 9(b), and 9(c), the amplitude spectrums 910, 920, 930 can be represented for the cap rock 830, the pay zone 840, and the bed rock 850, respectively, as derived from either step 1001-1 or step 1001-2, as shown in FIG. 10(a).

At step 1002, preliminary upper and lower boundaries and pay zone thickness for the well (BT) can be derived from a geophysical survey and/or an offset well. If a vertical section 810 of the well, as shown in FIG. 8, is drilled, the actual upper and lower boundaries A, A' and the pay zone thickness (i.e., A-A') at the vertical section 810 can be determined and recorded. Based on this information, an operator can now steer the drill bit through a lateral section 820 (FIG. 8) of the well using the following procedure.

In accordance with an embodiment of the invention, the lateral section 820 of the well can be drilled, at step 1003, at a starting point positioned higher than a middle depth of the pay zone 840 along a predefined path. Drill bit acoustic logging, i.e., applying the acoustic signal analyzing apparatus to obtain the acoustic signature, can be conducted whenever the drilling is in operation. At step 1004, the acoustic signature of the drilled rock outputted from the acoustic signal analyzing apparatus can be compared against the known acoustic signatures 910, 920 for the cap rock 830 and the pay zone 840, respectively (AS). If the observed acoustic signature of the drilled rock is the same as the known acoustic signature 910 of the cap rock 830, but different from the known acoustic signature 920 of the pay zone 840, the drill bit 101 has not entered the pay zone 840, and thus the drill bit 101 is still drilling in the cap rock 830, as decided at step 1005. In this scenario, the drill bit 101, at step 1006-1, can continue to drill along the predefined path. Otherwise, if the observed acoustic signature of the drilled rock is different from the known acoustic signature 910 of the cap rock 830, but the same as the known acoustic signature 920 of the pay zone 840, the drill bit 101 has entered and is drilling in the pay zone 840. In this scenario, the drill bit 101, at step 1006-2, can continue drilling along the predefined path until it reaches the middle, or a preferred position, of the pay zone 840.

In accordance with an embodiment of the invention, when the drill bit 101 reaches the middle, or a preferred position, of the pay zone 840, the drill bit 101 can be controlled to drill in a lateral direction through the well. At step 1007, if predefined, preliminary boundaries for the upper layer and/or the lower layer of the pay zone 840 are available, the drilling of the drill bit 101 can be directed parallel to one of the boundaries (step 1008-1). Otherwise, if predefined, preliminary boundaries of the pay zone 840 are not available, the drilling of the drill bit 101 can be operated in a horizontal direction through the well (step 1008-2). For example, as shown in FIG. 8, the predefined, preliminary boundaries in the section between A and B are assumed to be unavailable. In accordance with an embodiment of the invention, the well is drilled horizontally in this section between A and B.

Figure 11:
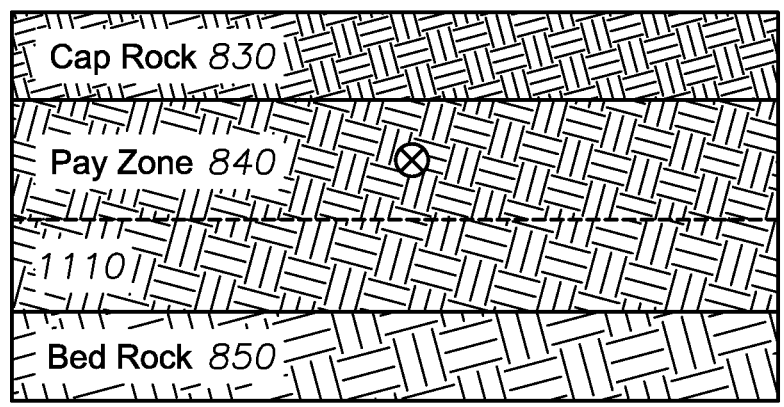
FIG. 11 is a cross sectional view of a lateral pay zone having a strong lithology contrast at an upper boundary and a gradual lithology change downward in a transitional zone, in accordance with an embodiment of the invention.

If the acoustic signature 920 of the pay zone 840 gradually changes upward or downward (step 1009), as shown in FIGS. 8 and 11 (FIG. 11 is a cross sectional area of a lateral pay zone having a strong lithology contrast at an upper boundary and a gradual lithology change downward in a transitional zone 1110 (marked by a dashed line to a lower boundary)), the drilling of the drill bit 101 can be continuously adjusted, at step 1010, to keep the drill bit 101 drilling along an optimal path (prolific) by comparing the observed acoustic signature of the drilled rock against the known signature 920 of the pay zone 840, as shown in FIG. 10(*b*). For example, since the lithology of the pay zone 840 gradually changes downward from a certain depth, as shown in FIG. 11, the amplitude spectrum 920 of the pay zone 840 may be gradually changing to the amplitude spectrum 930, with picks marked by a star gradually shrinking and new picks marked by an arrow gradually rising.

In accordance with an embodiment of the invention, when the driller determines that the amplitude spectrum of the observed acoustic signature of the drilled rock is gradually changing from the amplitude spectrum 920 of the pay zone 840 into the amplitude spectrum 930 of the bed rock 850, the driller knows that the drill bit 101 is gradually drilling downward (i.e., relative to the upper and lower boundaries of the pay zone 840) toward the bed rock 850. As a result, the driller can adjust the drilling of the drill bit 101 upward to follow the most prolific zone.

During the lateral drilling of the well, drill bit acoustic logging, i.e., applying the acoustic signal analyzing apparatus to obtain the acoustic signature, can be conducted and the observed acoustic signature of the drilled rock can be continuously compared, at step 1011, against the known acoustic signatures 910, 920, 930 of the cap rock 830, pay zone 840, and bed rock 850, respectively (AS), as shown in FIG. 10(*b*). If the observed acoustic signature of the drilled rock is the same or similar to the acoustic signature 920 of the pay zone 840, the drill bit 101 is still drilling in the pay zone 840. In this scenario, the drill bit 101 can be operated, at step 1013-1, to continue drilling along its current path. If the observed acoustic signature is same as or similar to the known acoustic signature 910, 930 of the cap rock 830 or bed rock 850, respectively, as determined at step 1012, then the driller can determine that the drill bit 101 is drilling out of the pay zone 840 and into the upper or low boundary of the pay zone 840. At this point, the vertical position of the upper and/or lower boundaries at this lateral position within the well can be determined and the upper and lower boundaries of the pay zone 840 (BT) can be updated, at step 1013-2 (see, for example, positions B and C in FIG. 8). In accordance with an embodiment of the invention, the vertical position at the opposite boundary can then be estimated based on the predetermined thickness of the pay zone 840, such as positions B' and C'. If predefined, preliminary boundaries are not available, for example, between positions A and C in FIG. 8, the upper and lower boundaries of the pay zone 840 can be drawn by connecting the known positions (e.g., A, A', B, and C) and the estimated positions (e.g., B' and C'). As shown, for example, in FIG. 8, the upper boundary of the pay zone 840 can be drawn by connecting positions A-B'-C, and the lower boundary of the pay zone 840 can be drawn by connecting positions A'-B-C'.

As further shown in FIG. 8, if the drill bit 101 has been drilled through the pay zone 840 from one boundary to the opposite boundary as, for example, from positions A to B to C, the spectrum of the acoustic signature 920 of the pay zone 840 in a vertical direction, although not at the same location, can be determined and updated (AS), at step 1013-2, as shown in FIG. 10(*b*).

In accordance with an embodiment of the invention, when the drill bit 101 is being drilled at a boundary (i.e., either the upper or lower boundary of the pay zone 840), the drilling of the drill bit 101 can be steered, at step 1014, toward the middle, or a preferred position, of the pay zone 840 along a shortest possible path. There are two scenarios at this step. If the acoustic signatures 910, 930 of the cap rock 830 and the bed rock 850 are distinctively different, as illustrated in FIGS. 9(*a*), 9(*b*), and 9(*c*), the driller would know from the acoustic signature which boundary the drill bit 101 is being drilled at. The driller can then steer the drill bit 101 accordingly toward the middle, or a preferred position, of the pay zone 840 along a shortest possible path. If, otherwise, the acoustic signatures 910, 930 of the cap rock 830 and the bed rock 850 are not distinctively different, then the drilling direction of the drill bit 101 can be determined using a trial-and-error approach.

First, the driller needs to prejudge the relative position of the boundary the drill bit 101 is drilling at based on other information. The driller then steers the drilling of the drill bit 101 "toward the middle" of the pay zone 840. If, after drilling the drill bit 101 "toward the middle" for a reasonable distance, the acoustic signature of the drilled rock shows, that the drill bit 101 is entering the pay zone 840, the driller needs to continue the drilling of the drill bit 101 toward the middle, or a preferred position, of the pay zone 840. If, otherwise, after drilling the drill bit 101 "toward the middle" for a reasonable distance, the acoustic signature of the drilled rock shows, that the drill bit 101 is still drilling the boundary rock, then the drilling of the drill bit 101 has been steered in the wrong direction. The driller needs to steer the drilling of the drill bit 101 in an opposite direction and to drill toward the middle, or a preferred position, of the pay zone 840.

At step 1015, the pay zone 840 thickness (BT) can be updated whenever possible. For example, when steering the drill bit 101 from an upper boundary of the pay zone 840 toward the middle of the pay zone 840, if the drill bit 101 drills into the transitional zone 1110 before it reaches the anticipated middle depth of the pay zone 840, the assumed thickness of the pay zone 840 has been overestimated and can then be adjusted and updated. After the drill bit 101 reaches the middle, or a preferred position, of the pay zone, the drilling of the drill bit 101 can be steered through the pay zone 840 of the well by repeating the procedure described above beginning with step 1007, until the drill bit 101 reaches a desired bottom hole depth of the well.

In accordance with an embodiment of the invention, when the process, as shown in FIGS. 10(*a*) and (*b*), reaches step 1007 after the first iteration, there are two scenarios to guide the drilling of the drill bit 101 based on the availability of predefined boundaries before drilling. If predefined boundaries are available, such as the lateral section of the pay zone 840 after position C, the drilling of the drill bit 101 can be guided by operating the drill bit 101 to drill parallel to one of the predefined boundaries. Otherwise, if predefined boundaries are not available, such as, for example, the section between positions A and C in FIG. 8, the drilling of the drill bit 101 can be kept parallel to the extension of one of the boundaries (i.e., either the upper or lower boundary of the pay zone 840) established during the drilling. For example, as shown in FIG. 8, when the drilling of the drill bit 101 reaches the middle, or a preferred depth, of the pay zone 840 after position B, the drilling of the drill bit 101 can be kept parallel to line BB" which is the extension of the newly established boundary A'B. However, if it is determined that the trend of the boundaries may change after the established boundary (i.e., after position B in FIG. 8), the drilling of the drill bit 101 can follow a modified extension of the newly established boundary. In accordance with an embodiment of the invention, the boundaries (i.e., the upper and lower boundaries of the pay zone 840) can also be updated by applying other geosteering tools in the operation of the drill bit 101.

Figure 12:
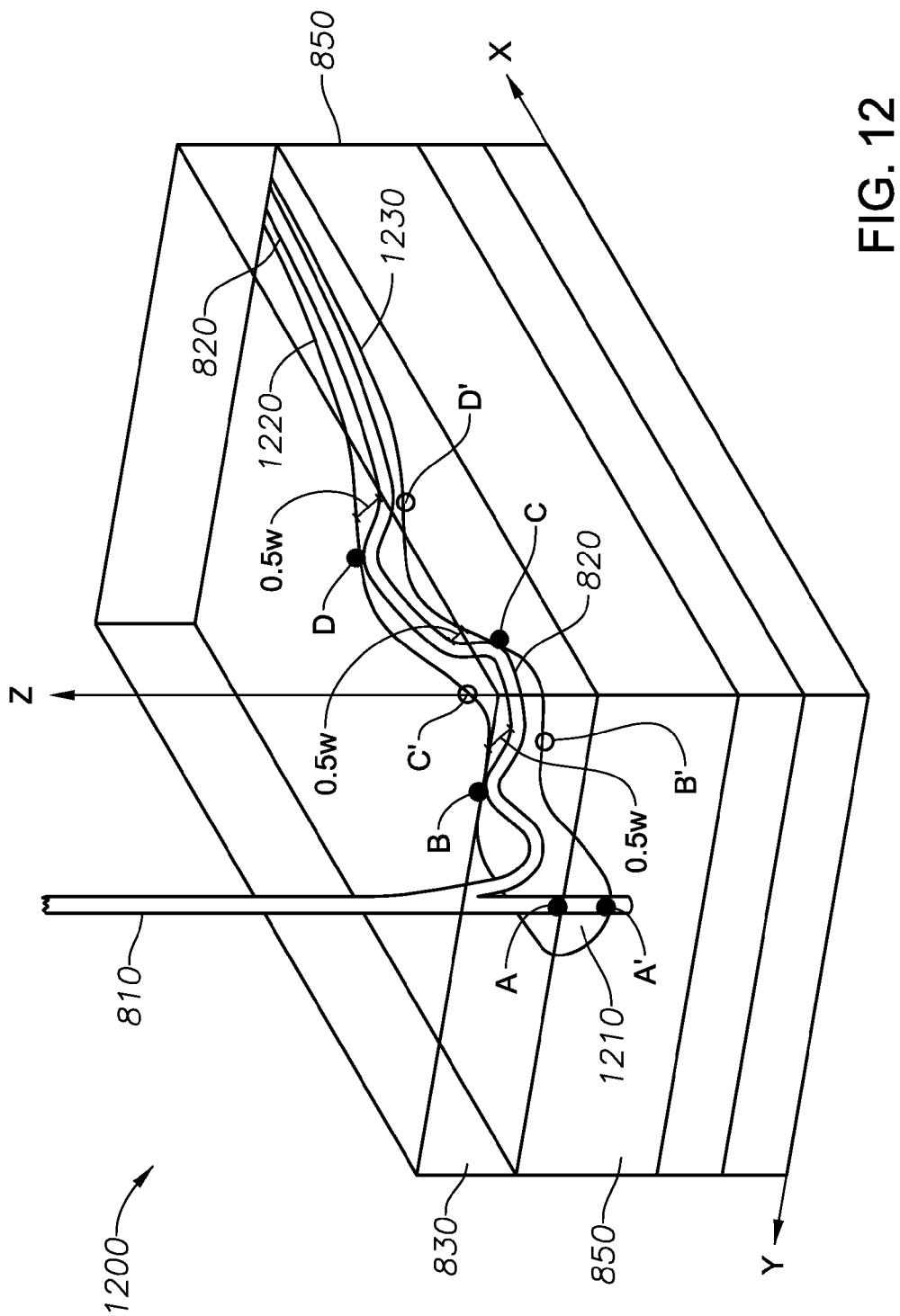
FIG. 12 is a perspective view of a path taken by a drill bit through a channel pay zone using acoustic signals generated by the drill bit drilling into rock, in accordance with an embodiment of the invention.
Figure 13A:
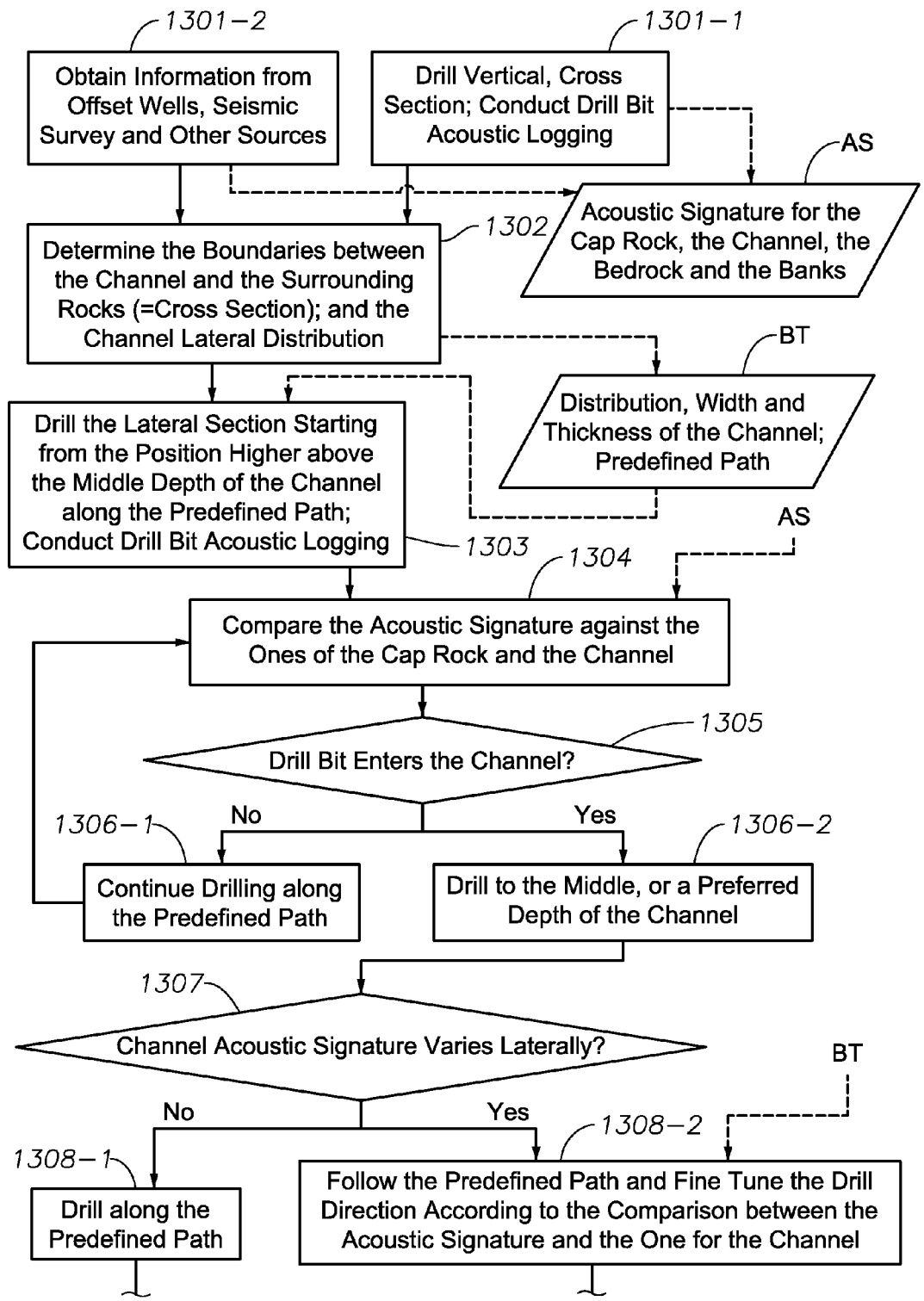
FIGS. 13(a)-(c) are flow diagrams of a method performed by the acoustic signal analyzing apparatus, as shown in FIG. 1, for left-right steering a drill bit through a channel pay zone, in accordance with an embodiment of the invention.
Figure 13B:
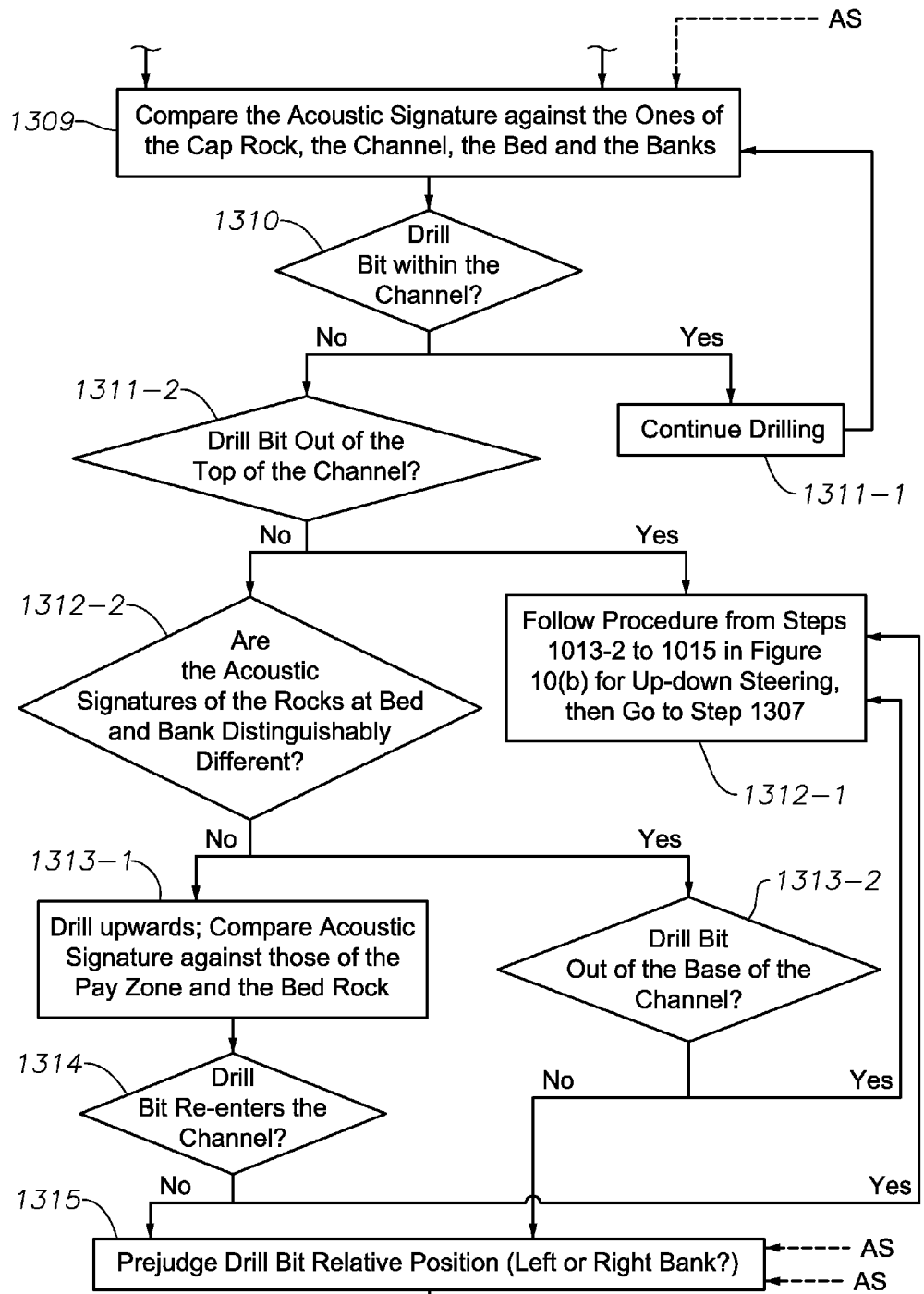
Figure 13C:
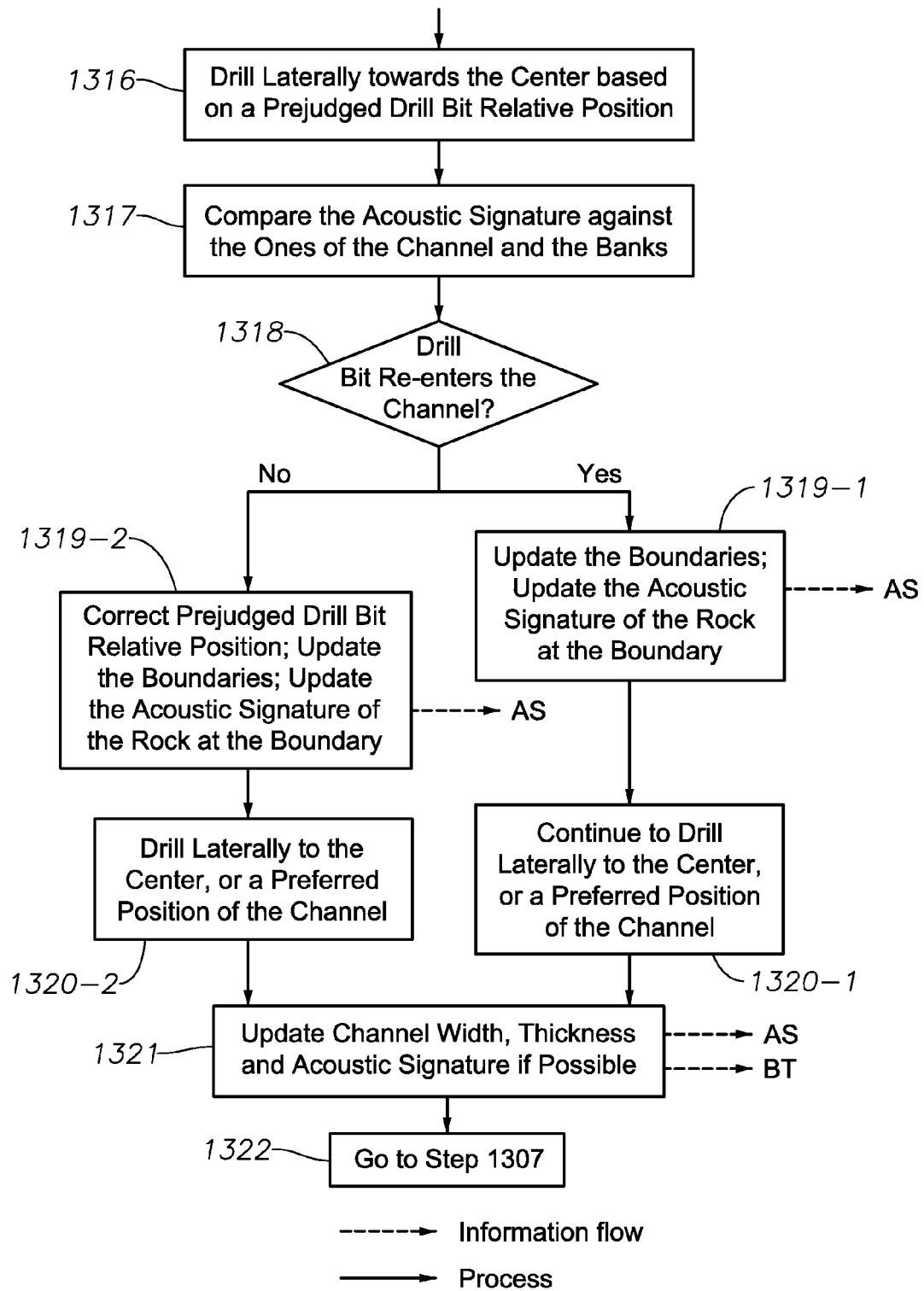

Left-Right Steering a Drill Bit Through a Channel Pay Zone:

FIGS. 12, 13(*a*)-(*c*), 14, and 15 illustrate a procedure for steering a drill bit through a channel pay zone using the geosteering system shown in FIG. 1, in accordance with an embodiment of the invention. Specifically, FIG. 12 is a perspective view of a path taken by a drill bit through a channel pay zone using acoustic signals generated by the drill bit drilling into rock, in accordance with an embodiment of the invention. FIGS. 13(*a*)-(*c*) are flow diagrams of a method performed by the acoustic signal analyzing apparatus, as shown in FIG. 1, for left-right steering a drill bit through a channel pay zone, in accordance with an embodiment of the invention. FIG. 14 is a cross sectional view of a channel pay zone having a material in a channel which gradually becomes muddy toward the banks of the channel, in accordance with an embodiment of the invention. FIG. 15 is a perspective view of predefined, preliminary and actual bank boundaries of a channel, in accordance with an embodiment of the invention.

As shown in FIG. 12, for purposes of illustrating the procedure described in FIGS. 13(*a*)-(*c*), a river channel 1210, in accordance with an embodiment of the invention, can meander along its course (i.e., it is not straight). As further shown in FIG. 12, the vertical position of the river channel 1210 may also gradually vary along its course. After being buried in geological history, the vertical position of the river channel 1210 may vary more due to changes caused by tectonic processes. Thus, the position of a geologically ancient sand channel buried in underground may vary vertically and laterally. FIG. 12, as an example, shows such a river channel 1210 (e.g., a sand channel) with its position varying laterally. In accordance with an embodiment of the invention, the aim of geosteering a drill bit 101 through the pay zone of the river channel 1210 (hereinafter referred to as "channel pay zone 1210"), as shown in FIG. 12, is to keep the drill bit 101 following the channel pay zone 1210 in both the lateral and vertical directions.

Generally, a buried sand channel has a sharp lithological contrast with its underlying and overlying sedimentary rocks (e.g., cap rock 830 and bed rock 850), which can include, for example, mudstone or shale. As shown in FIG. 14, the cross sectional area of the lithology of the sand channel (i.e., of the channel pay zone 1210) may gradually change from sand/sandstone to mudstone or shale toward the sand channel's banks. These characteristics of lithology variation in the vertical and horizontal direction can be used in the steering of the drill bit 101 by employing an acoustic signal analyzing apparatus, as described above for FIG. 1.

In accordance with various embodiments of the invention, the drill bit 101 being drilled through a channel pay zone 1210 can be steered in both up-down and left-right directions. Up-down steering is performed using the procedure, as shown in FIGS. 8, 9(*a*), 9(*b*), 9(*c*), and 10(*a*) and (*b*), described above.

In accordance with an embodiment of the invention, FIG. 12 shows a buried river channel 1210 with its cap rock 830 and bed rock 850. A lateral section 820 of the channel pay zone 1210 can be side tracked from the vertical section 810. In FIG. 12, the lateral section 820 can be drilled by following the middle of the channel pay zone 1210 (i.e., the well path is 0.5w=the width of the channel) away from each bank. In accordance with certain embodiments of the invention, the lateral section 820 of the channel pay zone 1210 can follow a different path, for example, along a path 0.4w away from the left bank or a path 0.6w away from the right bank, as non-limiting examples.

In accordance with an embodiment of the invention, the acoustic signatures 910, 920, 930, 940 (not shown) of the cap rock 830, the channel pay zone 1210, the bed rock 850, and the banks 1220, 1230 of a well (AS) can be derived, at step 1301-1, by (1) conducting drill bit acoustic logging, i.e., applying the acoustic signal analyzing apparatus to obtain the acoustic signature, while drilling a vertical section 810 (FIG. 12) and a cross section (not shown) of the well; or (2) obtaining, at step 1301-2, the acoustic signatures 910, 920, 930, 940 from offset wells or a database, as shown in FIG. 13(*a*).

As further shown in FIG. 13(*a*), the preliminary boundaries between the channel pay zone 1210 and its surrounding rocks (e.g., cap rock 830, bed rock 850, and banks 1220, 1230), and the channel pay zone's 1210 lateral distribution along its course can be derived, at step 1302, from the information collected at steps 1301-1 or 1301-2. If a vertical section 810 (FIG. 8) is drilled, at step 1301-1, the boundary positions A, A' and the channel pay zone 1210 thickness at the vertical section 810 can be determined and updated (BT). If a cross section is drilled, at step 1301-1, the boundaries between the channel pay zone 1210 and the banks 1220, 1230, and the channel pay zone 1210 width at the cross section can be determined and updated (BT). Thus, in accordance with an embodiment of the invention, steps 1301-1 and 1301-2 can be used to determine the prior information AS, BT, and thus the drilling of the drill bit 101 through the lateral section 820 (see FIG. 12) can be steered by employing the following procedure.

In accordance with an embodiment of the invention, the lateral section 820 (FIG. 12) can be drilled, at step 1303, starting at a point positioned higher than a middle depth of the channel pay zone 1210 along a predefined path (FIG. 12). Drill bit acoustic logging, i.e., applying the acoustic signal analyzing apparatus to obtain the acoustic signature, can be conducted whenever the drilling is in operation. At step 1304, the acoustic signature of the drilled rock outputted from the acoustic signal analyzing apparatus can be compared against the known acoustic signatures 910, 920 for the cap rock 830 and the channel pay zone 1210, respectively (AS). If the observed acoustic signature of the drilled rock is the same as the known acoustic signature 910 of the cap rock 830, but different from the known acoustic signature 920 of the channel pay zone 1210, the drill bit 101 has not entered the channel pay zone 1210, and thus is still drilling in the cap rock 830, as decided at step 1305. In this scenario, the drill bit 101, at step 1306-1, can continue to drill along the predefined path. Otherwise, if the observed acoustic signature of the drilled rock is different from the known acoustic signature 910 of the cap rock 830, but the same as the known acoustic signature 920 of the channel pay zone 1210, the drill bit 101 has entered and is drilling in the channel pay zone 1210. In this scenario, the drill bit 101, at step 1306-2, can continue drilling along the predefined path until it reaches the middle, or a preferred position, of the channel pay zone 1210.

In accordance with an embodiment of the invention, when the drill bit 101 reaches the middle, or a preferred position, of the channel pay zone 1210, lateral drilling of the drill bit 101 through the well can begin. Based on whether the acoustic signature 920 of the channel pay zone 1210 gradually changes toward the banks 1220, 1230, drilling of the drill bit 101, at step 1307, can be steered in two different ways. For example, as shown in FIG. 13(*a*), if the acoustic signature 920 of the channel pay zone 1210 does not gradually change toward the banks 1220, 1230, the drilling of the drill bit 101, at step 1308-1, can continue laterally along the predefined path parallel to one of the boundaries (i.e., the left or right banks of the channel pay zone 1210). Otherwise, the drilling of the drill bit 101 can be continuously adjusted, at step 1308-2, to keep the drill bit 101 drilling along an optimal path (prolific) by comparing the observed acoustic signature of the drilled rock against the known acoustic signature 920 of the channel pay zone, as shown in FIG. 13(*a*). For example, if the lithology of the channel pay zone 1210 gradually changes toward one of the banks 1220, 1230 from a certain position, as shown in FIG. 14, the amplitude spectrum 920 of the channel pay zone 1210 may be gradually changing from a pattern of good sandstone to a pattern of muddy sandstone, and then to a pattern of mudstone.

In accordance with an embodiment of the invention, when the driller determines that the amplitude spectrum of the observed acoustic signature of the drilled rock is gradually changing from a pattern of good sandstone to a pattern of mudstone, the driller knows that the drill bit 101 may be gradually drifting away from the most prolific zone. Accordingly, the driller can then immediately take action to restore the drilling of the drill bit 101 toward the best zone (i.e., staying within the channel pay zone 1210), resulting in a lateral well with maximum contact within the channel pay zone 1210.

As shown in FIG. 13(*b*), during the lateral drilling, drill bit acoustic logging, i.e., applying the acoustic signal analyzing apparatus to obtain the acoustic signature, can be conducted and the observed acoustic signature of the drilled rock can be continuously compared, at step 1309, against the known acoustic signatures 910, 920, 930, 940 of the cap rock 830, the channel pay zone 1210, the bed rock 850, and the banks 1220, 1230, respectively, to determine, at step 1310, whether the drill bit 101 is drilling within the channel pay zone 1210. If the observed acoustic signature of the drilled rock is the same or similar to the known acoustic signature 820 of the channel pay zone 1210, the drill bit 101 is still drilling in the channel pay zone 1210. In this scenario, the drill bit 101 can be operated, at step 1311-1, to continue drilling along its current path. If it is determined that the drill bit 101 is drilling out of the channel pay zone 1210, a determination can be made as to which direction that the drill bit 101 is drilling out of the channel pay zone 1210. For example, in accordance with an embodiment of the invention, if the observed acoustic signature of the drilled rock is the same as or similar to the known acoustic signature 910 of the cap rock 830, it can be determined, at step 1311-2, that the drill bit 101 is drilling out of the top of the channel pay zone 1210 into the cap rock 830; and therefore, the drill bit 101 can be to be steered, at step 1312-1, back into the channel pay zone 1210 using the up-down steering method, as shown in FIGS. 10(*a*) and (*b*).

As further shown in FIG. 13(*b*), if it is determined that the drill bit 101 is not drilling out of the top of the channel pay zone 1210, then the drill bit 101 may either be drilling toward a bank 1220, 1230 or the bed rock 850. To differentiate these different possibilities, it must be determined, at step 1312-2, whether the acoustic signatures of the rocks at the bed rock 850 and the bank 1220, 1230 are distinguishably different from one another. If they are distinguishably different, then it can be determined, based on this difference, which direction the drill bit 101 is drilling by comparing the observed acoustic signature of the drilled rock against the known acoustic signatures 930, 940 of the bed rock 850 and the banks 1220, 1230. If the observed acoustic signature of the drilled rock is the same or similar to that of the bed rock 850, then the driller can determine, at step 1313-2, that the drill bit 101 is drilling out of the base of the channel pay zone 1210 into the bed rock 850. In this scenario, the drill bit 101 can be steered back toward the channel pay zone 1210 by following step 1312-1. If the acoustic signature of the drilled rock is the same or similar to the acoustic signature 940 of the rock at the banks 1220, 1230, then the driller can determine that the drill bit 101 is drilling out of the channel pay zone 1210 from the banks 1220, 1230; and therefore, the drill bit 101 can be steered back into the middle, or a prolific position, of the channel pay zone 1210 by following step 1315.

If, at step 1312-2, it is determined that the acoustic signatures of the bed rock 850 and the bank 1220, 1230 are not distinguishably different, then the drilling direction of the drill bit 101 can be determined using a trial and error approach. In accordance with an embodiment of the invention, the trial and error approach includes operating, at step 1313-1, the drill bit 101 to drill upward for a short distance, and then comparing the observed acoustic signature of the drilled rock against the acoustic signature 920, 930 of the channel pay zone 1210 and the bed rock 850 to determine whether the drill bit 101 is re-entering the channel pay zone 1210. If it is determined, in step 1314, that the drill bit 101 is re-entering the channel pay zone 1210, the drill bit 101 was drilling out of the base of the channel pay zone 1210; and therefore, the drill bit 101 can be steered back into the channel pay zone 1210 by following step 1312-1. If it is determined, in step 1314, that the drill bit 101 is not re-entering the channel pay zone 1210, the drill bit 101 was drilling out of the channel pay zone 1210 from one of the banks 1220, 1230; and therefore, the drill bit 101 can be steered back into the middle, or a prolific position, of the channel pay zone 1210 by following step 1315.

In accordance with an embodiment of the invention, when redirecting the drill bit 101 from the bank 1220, 1230 into the center of the channel pay zone 1210, the driller can decide which side (e.g., the left or right bank 1220, 1230) (FIG. 14) the drill bit 101 is drilling away from the channel pay zone 1210. In accordance with an embodiment of the invention, information, such as the channel lateral distribution (BT), the acoustic signatures of the left and right bank 940 (AS), if they are different, can help the driller derive, in step 1315, a prejudged drill bit relative position. The driller can now steer, in step 1316, the drill bit 101 toward the center of the channel pay zone 1210 in the opposite direction of the prejudged drill bit relative position. For example, if the driller determines that the drill bit 101 is drilling into the left bank 1220 (FIG. 15), the driller can steer the drill bit 101 right toward the center of the channel pay zone 1210.

As shown in FIG. 13(*c*), when drilling "toward the center" of the channel pay zone 1210, the observed acoustic signature of the drilled rock can be compared, at step 1317, against the acoustic signature 920, 940 of the channel pay zone 1210 and the banks 1220, 1230, respectively, to determine, at step 1318, whether the drill bit 101 has re-entered the channel pay zone 1210. If it is determined that the drill bit 101 shortly enters the channel pay zone 1210, the driller can determine that the prejudgment of the relative position of the drill bit 101 is correct. At step 1319-1, based on the determination that the prejudgment of the relative position of the drill bit 101 was correct, the confirmed boundary position and the acoustic signature 940 of the rock at the banks 1220, 1230 can be updated. For example, in FIG. 12, if the driller determined, using the above procedure, that the drill bit 101 is drilling out the channel pay zone 1210 at a boundary position B, the preliminary boundary position derived before the lateral drilling can be precisely determined at the point B. The boundary position at the opposite position B' can also now be estimated more accurately (i.e., assuming that the width of the channel pay zone 1210 is known). If the prejudgment of the relative position of the drill bit 101 is correct, the drill bit 101 is operated, at step 1320-1, to continue drilling until it reaches the center, or a preferred position, of the channel pay zone 1210 along a possible shortest path.

In accordance with an embodiment of the invention, if, after drilling "toward the center" of the channel pay zone 1210 for a reasonable distance, the acoustic signature of the drilled rock shows, at step 1317, that the drill bit 101 is entering the bank 1220, 1230, the prejudgment of the relative position of the drill bit 101 can be determined to be incorrect. For example, in FIG. 15, when the drill bit 101 is at a point P and it reaches one of the banks 1220, 1230, if the relative position of the drill bit 101 has been prejudged incorrectly as being at the right bank 1230, the driller can steer the drill bit 101 left toward the "center" of the channel pay zone 1210, as indicated by the dashed arrow at point P in FIG. 15. If the drill bit 101 is actually at the left bank 1220, the drill bit 101 would be entering the left bank 1220 instead of leaving it, based on the direction of drilling. In this case, the prejudged drill bit relative position can be corrected, at step 1319-2. For the example in FIG. 15, the drill bit relative position at point P can be positioned at the left bank 1220 instead of the right bank 1230. Accordingly, the absolute boundary position at point P, and the acoustic signature 940 of the rock at the banks 1220, 1230 can be updated, at step 1319-2. The drilling of the drill bit 101 can then be redirected, at step 1320-2, toward the center, or a preferred position, of the channel pay zone 1210 along a possible shortest path.

If the drill bit 101 has been drilled through the channel pay zone 1210 from one boundary to the opposite side, as, for example, from B to C and C to D, as shown in FIG. 12, the spectrum of the acoustic signature 920 of the channel pay zone 1210 in the lateral direction (although not at the same location) can be determined and updated (AS), at step 1321.

In accordance with an embodiment of the invention, the width of the channel pay zone 1210 can be estimated and updated during drilling (BT), at step 1321. For example, when steering the drill bit 101 from a bank 1220 or 1230 boundary toward the center of the channel pay zone 1210, if the drill bit 101 drills into a transitional zone before it reaches the anticipated center of the channel pay zone 1210, the width has been overestimated and can be adjusted and updated (BT), at step 1321.

In accordance with an embodiment of the invention, the thickness of the channel pay zone 1210 can also be estimated and updated during drilling (BT), at step 1321. For example, when steering the drill bit 101 from the upper boundary toward the center of the channel pay zone 1210, if the drill bit 101 drills into the lower boundary before it reaches the anticipated center of the channel pay zone 1210, the thickness has been overestimated and can be adjusted and updated (BT), at step 1321.

After the drill bit 101 reaches the center, or a preferred position, of the channel pay zone 1210, the drill bit 101 can be steered by following an iterative process beginning at step 1307, until the drill bit 101 has been drilled through the channel pay zone 1210 over a planned length of the channel pay zone 1210.

In accordance with an embodiment of the invention, during drilling, the bank boundaries at some points, such as B, C and D in FIG. 12, can be accurately determined, while the points at the opposite boundaries, such as B', C' and D', can also be accurately estimated based on the determined bank boundary points and the known width of the channel pay zone 1210.

Accordingly, embodiments of the invention provide non-obvious advantages over conventional geosteering systems. Where other LWD tools either provide a substantial delay in the time between the drilling of a rock and the provision of information, provide a reduced amount of information to the surface, or provide insufficient signal strength, various embodiments of the invention provide an acoustic signal having sufficient signal strength and provide a complete set of raw acoustic sensor data to a surface-based computer, real-time, which can derive information about lithology type at a position located at the cutting surface of the drill bit, to correspondingly provide such information, in real time, to the operator steering the drill bit. This advantage makes aspects of various embodiments of the invention ideal in the application of steering the drill bit in a desired direction, in real-time, based on the identified lithology type of the rock, for maintaining the drill bit within the pay zone of the lateral well.

Conventional geosteering systems use information 30-50 ft behind the drill bit to steer the drill bit, and therefore are not real-time techniques. Embodiments of the invention use information at the drill bit to steer it, and therefore provide a truly real-time technique, which provides non-obvious advantages over conventional geosteering systems.

The present invention may suitably comprise, consist or consist essentially of the elements disclosed and may be practiced in the absence of an element not disclosed. For example, it can be recognized by those skilled in the art that certain steps can be combined into a single step.

Unless defined otherwise, all technical and scientific terms used have the same meaning as commonly understood by one of ordinary skill in the art to which this invention belongs.

The singular forms "a", "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. A method for steering a drill bit within a pay zone in a lateral well, the method comprising:
   receiving acoustic signature data from an acoustic signal analyzing apparatus, wherein the acoustic signature data comprises an amplitude spectrum and one or more acoustic characteristics evaluated from an acoustic signal provided by a sensor attached to one of a drive shaft and a packing box of a drill rig, and generated in real-time as a result of rotational contact of the drill bit with encountered rock in the lateral well during drilling;
   comparing the received real-time acoustic signature data to predetermined acoustic signatures determined for a plurality of rock samples;
   identifying a lithology type of the rock being encountered by the drill bit based on the comparison; and
   steering the drill bit in a predefined direction, in real-time, based on the identified lithology type of the rock, for maintaining the drill bit within the pay zone of the lateral well.

2. The method of claim 1, further comprising:
   determining the predetermined acoustic signatures for the plurality of rock samples by well logging while drilling a vertical section of the lateral well or by obtaining the predetermined acoustic signatures from an offset well or database, wherein the plurality of rock samples comprise a cap rock, a pay zone, a bed rock, and a bank of the encountered rock.

3. The method of claim 1, further comprising:
   determining a location of a formation boundary of the pay zone of the encountered rock during drilling, wherein the formation boundary comprises one of an upper and a lower boundary of the encountered rock, wherein the upper boundary is a boundary between a cap rock and the pay zone and the lower boundary is a boundary between the pay zone and a bed rock or a bank.

4. The method of claim 1, wherein the comparing comprises comparing an acoustic signature of the encountered rock to predetermined acoustic signatures of a cap rock, a pay zone, a bed rock, and a bank of the encountered rock.

5. The method of claim 4, wherein the steering comprises steering the drill bit upward, when the acoustic signature of the encountered rock begins to change to the predetermined acoustic signature of the bed rock of the encountered rock, and steering the drill bit downward, when the acoustic signature of the encountered rock begins to change to the predetermined acoustic signature of the cap rock of the encountered rock.

6. The method of claim 4, further comprising:
   determining whether the predetermined acoustic signature of the bed rock is the same as or different than the acoustic signature of the bank of the encountered rock.

7. The method of claim 6, wherein, when the predetermined acoustic signatures of the bed rock and the bank of the encountered rock are different, the steering comprises steering the drill bit upward, when the acoustic signature of the encountered rock begins to change to the predetermined acoustic signature of the bed rock of the encountered rock, and steering the drill bit left or right, when the lithology type of the encountered rock is identified to be the bank of the encountered rock.

8. The method of claim 6, wherein, when the predetermined acoustic signatures of the bed rock and the bank of the encountered rock are the same, the steering comprises steering the drill bit along a second path comprising one of an upward, left or right direction, and comparing the acoustic signature of the encountered rock, in real-time, to the predetermined acoustic signatures of the pay zone, the bed rock, and the bank of the encountered rock to identify the lithology type of the encountered rock and to determine a drilling direction of the drill bit.

9. The method of claim 8, further comprising:
   adjusting the drilling direction of the drill bit toward the pay zone of the encountered rock based on the identified lithology type of the encountered rock, wherein the drilling direction is adjusted upward, when the lithology type of the encountered rock is of the bed rock, adjusted to the left, when the lithology type of the encountered rock is of a right bank, and adjusted to the right, when the lithology type of the encountered rock is of a left bank.

10. The method of claim 1, wherein the identifying comprises determining the lithology of the encountered rock to be one of a cap rock, a pay zone, a bed rock, or a bank of the encountered rock based on the comparing.

11. The method of claim 1, wherein the steering comprises initiating lateral drilling of the drill bit through the encountered rock at a middle depth of the pay zone along a predefined path.

12. The method of claim 11, wherein the steering further comprises steering the drill bit through the encountered rock along the predefined path until the drill bit reaches a middle or predetermined position of the pay zone of the encountered rock.

13. The method of claim 12, wherein the steering further comprises steering the drill bit, when the drill bit reaches the middle or the predetermined position of the pay zone, in a lateral direction through the pay zone of the encountered rock, when a formation boundary of the pay zone of the encountered rock is unknown.

14. The method of claim 12, wherein the steering further comprises steering the drill bit, when the drill bit reaches the middle or the predetermined position of the pay zone, in a direction parallel to a known formation boundary of the pay zone of the encountered rock.

15. The method of claim 1, wherein the steering comprises continuously receiving acoustic signature data from the an acoustic signal analyzing apparatus, comparing the received real-time acoustic signature data to the predetermined acoustic signatures determined for the plurality of rock samples, and identifying the lithology type of the rock being encountered by the drill bit based on the comparison, in real-time.

16. The method of claim 1, wherein the steering comprises steering the drill bit upward, when the lithology type of the encountered rock is identified to be the bed rock of the encountered rock, and steering the drill bit downward, when the lithology type of the encountered rock is identified to be the cap rock of the encountered rock.

17. An apparatus for steering a drill bit within a pay zone in a lateral well, the apparatus comprising:
- a drill bit configured to drill through an encountered rock in the lateral well;
- a sensor attached to at least one of a drive shaft and a packing box of a drill rig, and configured to receive real-time acoustic signature data indicating acoustic signatures of the rock being encountered by the drill bit; and
- a processor configured to
  - compare the received real-time acoustic signature data indicating acoustic signatures of the rock being encountered by the drill bit to predetermined acoustic signatures determined for a plurality of rock samples,
  - identify a lithology type of the rock being encountered by the drill bit based on the comparison, and
  - steer the drill bit in a predefined direction, in real-time, based on the identified lithology type of the rock, for maintaining the drill bit within the pay zone of the lateral well.

18. A computer readable storage medium encoded with a computer program product including a set of instructions stored in a non-transitory memory of the computer readable storage medium defining a server configured to receive acoustic signature data from an acoustic signal analyzing apparatus, that when the computer program product is executed by one or more processors of the server cause steering of a drill bit in a predefined direction, the set of instructions executable by the one or more processors to cause:
- receiving the acoustic signature data from the acoustic signal analyzing apparatus, wherein the acoustic signature data comprises an amplitude spectrum and one or more acoustic characteristics evaluated from an acoustic signal provided by a sensor attached to at least one of a drive shaft and a packing box of a drill rig, and generated in real-time as a result of rotational contact of the drill bit with encountered rock in the lateral well during drilling;
- comparing the received real-time acoustic signature data to predetermined acoustic signatures determined for a plurality of rock samples;
- identifying a lithology type of the rock being encountered by the drill bit based on the comparison; and
- steering the drill bit in the predefined direction, in real-time, based on the identified lithology type of the rock, for maintaining the drill bit within the pay zone of the lateral well.

\* \* \* \* \*